US008377999B2

(12) United States Patent
Cote et al.

(10) Patent No.: US 8,377,999 B2
(45) Date of Patent: *Feb. 19, 2013

(54) POROUS STRUCTURED ORGANIC FILM COMPOSITIONS

(75) Inventors: Adrien P. Cote, Clarkson (CA); Matthew A. Heuft, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/181,761

(22) Filed: Jul. 13, 2011

(65) Prior Publication Data
US 2013/0017390 A1    Jan. 17, 2013

(51) Int. Cl.
*B01J 49/00* (2006.01)
*C08J 5/20* (2006.01)
(52) U.S. Cl. ............... 521/27; 564/434; 564/443
(58) Field of Classification Search .......... 564/434, 564/443
See application file for complete search history.

(56) References Cited

U.S. PATENT DOCUMENTS

| | | | |
|---|---|---|---|
| 2,324,550 A | 7/1943 | Wolfe | |
| 3,430,418 A | 3/1969 | Wagner | |
| 3,801,315 A | 4/1974 | Gundlach et al. | |
| 4,078,927 A | 3/1978 | Amidon et al. | |
| 4,081,274 A | 3/1978 | Horgan | |
| 4,115,116 A | 9/1978 | Stolka et al. | |
| 4,233,384 A | 11/1980 | Turner et al. | |
| 4,257,699 A | 3/1981 | Lentz | |
| 4,265,990 A | 5/1981 | Stolka et al. | |
| 4,286,033 A | 8/1981 | Neyhart et al. | |
| 4,291,110 A | 9/1981 | Lee | |
| 4,299,897 A | 11/1981 | Stolka et al. | |
| 4,304,829 A | 12/1981 | Limburg et al. | |
| 4,306,008 A | 12/1981 | Pai et al. | |
| 4,338,387 A | 7/1982 | Hewitt | |
| 4,387,980 A | 6/1983 | Ueno et al. | |
| 4,457,994 A | 7/1984 | Pai et al. | |
| 4,464,450 A | 8/1984 | Teuscher | |
| 4,489,593 A | 12/1984 | Pieters et al. | |
| 4,493,550 A | 1/1985 | Takekida | |
| 4,664,995 A | 5/1987 | Horgan et al. | |
| 4,855,203 A | 8/1989 | Badesha et al. | |
| 4,871,634 A | 10/1989 | Limburg et al. | |
| 4,917,711 A | 4/1990 | Xie et al. | |
| 4,921,769 A | 5/1990 | Yuh et al. | |
| 4,921,773 A | 5/1990 | Melnyk et al. | |
| 5,017,432 A | 5/1991 | Eddy et al. | |
| 5,061,965 A | 10/1991 | Ferguson et al. | |
| 5,110,693 A | 5/1992 | Friend et al. | |
| 5,139,910 A | 8/1992 | Law et al. | |
| 5,165,909 A | 11/1992 | Tennent et al. | |
| 5,166,031 A | 11/1992 | Badesha et al. | |
| 5,281,506 A | 1/1994 | Badesha et al. | |
| 5,300,271 A | 4/1994 | Golden et al. | |
| 5,366,772 A | 11/1994 | Badesha et al. | |
| 5,368,913 A | 11/1994 | Ortega | |
| 5,368,967 A | 11/1994 | Schank et al. | |
| 5,370,931 A | 12/1994 | Fratangelo et al. | |
| 5,432,539 A | 7/1995 | Anderson | |
| 5,455,136 A | 10/1995 | Yu et al. | |
| 5,456,897 A | 10/1995 | Moy et al. | |
| 5,500,200 A | 3/1996 | Mandeville et al. | |
| 5,569,635 A | 10/1996 | Moy et al. | |
| 5,658,702 A | 8/1997 | Nukada | |
| 5,702,854 A | 12/1997 | Schank et al. | |
| 5,707,916 A | 1/1998 | Snyder et al. | |
| 5,853,906 A | 12/1998 | Hsieh | |
| 5,877,110 A | 3/1999 | Snyder et al. | |
| 5,976,744 A | 11/1999 | Fuller et al. | |
| 6,002,907 A | 12/1999 | Berkes | |
| 6,020,426 A | 2/2000 | Yamaguchi et al. | |
| 6,107,117 A | 8/2000 | Bao et al. | |
| 6,107,439 A | 8/2000 | Yanus et al. | |
| 6,248,686 B1 | 6/2001 | Inagaki et al. | |
| 6,340,382 B1 | 1/2002 | Baksh et al. | |
| 6,464,756 B1 | 10/2002 | Plee | |
| 6,505,921 B2 | 1/2003 | Chwalek et al. | |
| 6,819,224 B2 | 11/2004 | Brierley | |
| 6,819,244 B2 | 11/2004 | Dukler et al. | |
| 7,067,687 B2 | 6/2006 | Pinnavaia et al. | |
| 7,177,572 B2 | 2/2007 | DiRubio et al. | |
| 7,196,210 B2 | 3/2007 | Yaghi et al. | |
| 7,202,002 B2 | 4/2007 | Tokarski et al. | |
| 7,384,717 B2 | 6/2008 | Dinh et al. | |
| 7,416,824 B2 | 8/2008 | Kondoh et al. | |
| 7,582,798 B2 | 9/2009 | Yaghi et al. | |

(Continued)

FOREIGN PATENT DOCUMENTS

DE    10 2008 011 840 A1    9/2009
EP            0312376 A2    4/1989

(Continued)

OTHER PUBLICATIONS

Jun. 19, 2012 German Search Report issued in Application No. 10 2011 079 277.5 (with translation).
Aug. 10, 2012 Notice of Allowance issued in U.S. Appl. No. 13/181,912.
Aug. 3, 2012 Notice of Allowance issued in U.S. Appl. No. 12/845,053.
Aug. 10, 2012 Office Action issued in U.S. Appl. No. 12/716,449.
Aug. 3, 2012 Office Action issued in U.S. Appl. No. 12/716,686.
Jul. 6, 2012 Office Action issued in U.S. Appl. No. 12/716,706.
Aug. 3, 2012 Office Action issued in U.S. Appl. No. 12/815,688.
Jun. 25, 2012 Office Action issued in U.S. Appl. No. 12/845,052.
U.S. Appl. No. 13/572,095, filed Aug. 10, 2012 Sara J. Vella et al.
U.S. Appl. No. 13/571,933, filed Aug. 10, 2012 Sara J. Vella et al.
Extended European Search Report for European Patent Application No. 10749278.7 dated Aug. 8, 2012.
European Search Report for European Patent Application No. 10749283.7 dated Aug. 10, 2012.
European Search Report for European Patent Application No. 10749285.2 dated Aug. 6, 2012.
European Search Report for European Patent Application No. 10749276.1 dated Aug. 6, 2012.

(Continued)

*Primary Examiner* — Terressa Boykin
(74) *Attorney, Agent, or Firm* — Oliff & Berridge, PLC

(57) ABSTRACT

A porous structured organic film including a plurality of segments and a plurality of linkers arranged as a covalent organic framework, wherein at a macroscopic level the covalent organic framework is a film and contains a plurality of sites accessible to one or more entity.

20 Claims, 7 Drawing Sheets

U.S. PATENT DOCUMENTS

| | | |
|---|---|---|
| 8,065,904 B1 | 11/2011 | Allendorf et al. |
| 8,093,347 B2 * | 1/2012 | Heuft et al. ............... 528/211 |
| 8,119,314 B1 | 2/2012 | Heuft et al. |
| 8,119,315 B1 | 2/2012 | Heuft et al. |
| 2002/0098346 A1 | 7/2002 | Yitzchaik |
| 2003/0099845 A1 | 5/2003 | Ogawa et al. |
| 2003/0126989 A1 | 7/2003 | Bancon et al. |
| 2003/0172808 A1 | 9/2003 | Le Bec |
| 2004/0171482 A1 | 9/2004 | Pinnavaia et al. |
| 2004/0244865 A1 | 12/2004 | Jung et al. |
| 2005/0017633 A1 | 1/2005 | Miyadera |
| 2005/0257685 A1 | 11/2005 | Baksh et al. |
| 2005/0260443 A1 | 11/2005 | Marks et al. |
| 2006/0097393 A1 | 5/2006 | Uchimaru et al. |
| 2006/0154807 A1 | 7/2006 | Yaghi et al. |
| 2006/0182993 A1 | 8/2006 | Ogata et al. |
| 2006/0204742 A1 | 9/2006 | Gronbeck et al. |
| 2006/0236862 A1 | 10/2006 | Golden et al. |
| 2007/0123606 A1 | 5/2007 | Toma et al. |
| 2007/0287220 A1 | 12/2007 | Jeong et al. |
| 2008/0107980 A1 | 5/2008 | De Jong et al. |
| 2008/0132669 A1 | 6/2008 | Eriguchi et al. |
| 2008/0233343 A1 | 9/2008 | Cheng et al. |
| 2008/0268135 A1 | 10/2008 | Yokoyama et al. |
| 2008/0316247 A1 | 12/2008 | Cellura et al. |
| 2009/0025555 A1 | 1/2009 | Lively et al. |
| 2009/0046125 A1 | 2/2009 | Nystrom et al. |
| 2009/0053417 A1 | 2/2009 | Mino |
| 2009/0117476 A1 | 5/2009 | Heuft et al. |
| 2009/0149565 A1 | 6/2009 | Liu et al. |
| 2010/0015540 A1 | 1/2010 | Dinh et al. |
| 2010/0143693 A1 | 6/2010 | Yaghi et al. |
| 2010/0227071 A1 | 9/2010 | Heuft et al. |
| 2010/0227998 A1 | 9/2010 | Heuft et al. |
| 2010/0240781 A1 | 9/2010 | Cooper et al. |
| 2011/0011128 A1 | 1/2011 | Grover |
| 2011/0030555 A1 | 2/2011 | Jonschker et al. |
| 2011/0076605 A1 | 3/2011 | Doi et al. |
| 2011/0236301 A1 | 9/2011 | Kang et al. |
| 2012/0029236 A1 * | 2/2012 | Cote et al. ............... 564/434 |
| 2012/0031268 A1 | 2/2012 | Yaghi et al. |
| 2012/0152117 A1 | 6/2012 | Lively et al. |

FOREIGN PATENT DOCUMENTS

| | | |
|---|---|---|
| JP | 9 087849 A | 3/1997 |
| KR | 10-0832309 B1 | 5/2008 |
| WO | WO 91/15813 | 10/1991 |
| WO | WO 2006/064892 A1 | 6/2006 |
| WO | WO 2007/090864 A1 | 8/2007 |
| WO | WO 2007/098263 A2 | 8/2007 |
| WO | WO 2008/091976 A1 | 7/2008 |
| WO | WO 2009/022187 A1 | 2/2009 |
| WO | WO 2009/127896 A1 | 10/2009 |
| WO | WO 2010/102018 A1 | 9/2010 |
| WO | WO 2010/102025 A1 | 9/2010 |
| WO | WO 2010/102027 A1 | 9/2010 |
| WO | WO 2010/102036 A1 | 9/2010 |
| WO | WO 2010/102038 A1 | 9/2010 |
| WO | WO 2010/102043 A1 | 9/2010 |

OTHER PUBLICATIONS

European Search Report for European Patent Application No. 10749274.6 dated Aug. 6, 2012.
European Search Report for European Patent Application No. 10749289.4 dated Aug. 10, 2012.
Notice of Allowance for U.S. Appl. No. 13/315,452 mailed Aug. 15, 2012.
Sep. 6, 2012 Office Action issued in U.S. Appl. No. 13/182,047.
Sep. 6, 2012 Office Action issued in U.S. Appl. No. 12/716,324.
Shun Wan et al., "A Belt-Shaped, Blue Luminescent, and Semiconducting Covalent Organic Framework," Angew. Chem. Int. Ed., vol. 47, pp. 8826-8830 (published on web Jan. 10, 2008).
Nikolas A. A. Zwaneveld et al., "Organized Formation of 2D Extended Covalent Organic Frameworks at Surfaces," *J. Am. Chem. Soc.*, vol. 130, pp. 6678-6679 (published on web Apr. 30, 2008).
Adrien P. Cote et al., "Porous, Crystalline, Covalent Organic Frameworks," *Science*, vol. 310, pp. 1166-1170 (Nov. 18, 2005).
Hani El-Kaderi et al., "Designed Synthesis of 3D Covalent Organic Frameworks," *Science*, vol. 316, pp. 268-272 (Apr. 13, 2007).
Adrien P. Cote et al., "Reticular Synthesis of Microporous and Mesoporous Covalent Organic Frameworks" *J. Am. Chem. Soc.*, vol. 129, 12914-12915 (published on web Oct. 6, 2007).
Omar M. Yaghi et al., "Reticular synthesis and the design of new materials," *Nature*, vol. 423, pp. 705-714 (Jun. 12, 2003).
Nathan W. Ockwig et al., "Reticular Chemistry: Occurrence and Taxonomy of Nets and Grammar for the Design of Frameworks," *Acc. Chem. Res.*, vol. 38, No. 3, pp. 176-182 (published on web Jan. 19, 2005),.
Pierre Kuhn et al., Porous, Covalent Triazine-Based Frameworks Prepared by Ionothermal Synthesis, *Angew. Chem. Int. Ed.*, vol. 47, pp. 3450-3453. (Published on web Mar. 10, 2008).
Jia-Xing Jiang et al., "Conjugated Microporous Poly(aryleneethylnylene) Networks," *Angew. Chem int. Ed.*, vol. 46, (2008) pp, 1-5 (Published on web Sep. 26, 2008).
Hunt, J.R. et al. "Reticular Synthesis of Covalent-Organic Borosilicate Frameworks" *J. Am. Chem. Soc.*, vol. 130, (2008), 11872-11873. (published on web Aug. 16, 2008).
Apr. 28, 2010 International Search Report issued in PCT/US 10/26082.
Apr. 28, 2010 Written Opinion issued in PCT/US 10/26082.
Apr. 27, 2010 International Search Report issued in PCT/US 10/26071.
Apr. 27, 2010 Written Opinion issued in PCT/US 10/26071.
Apr. 28, 2010 International Search Report issued in PCT/US 10/26091.
Apr. 28, 2010 Written Opinion issued in PCT/US 10/26091.
Apr. 28, 2010 International Search Report issued in PCT/US 10/26100.
Apr. 28, 2010 Written Opinion issued in PCT/US 10/26100.
Apr. 16, 2010 International Search Report issued in PCT/US 10/26079.
Apr. 16, 2010 Written Opinion issued in PCT/US 10/26079.
Apr. 20, 2010 International Search Report issued in PCT/US 10/26094.
Apr. 20, 2010 Written Opinion issued in PCT/US 10/26094.
U.S. Appl. No. 12/716,571, filed Mar. 3, 2010 Matthew A. Heuft et al.
U.S. Appl. No. 12/716,524, filed Mar. 3, 2010 Matthew A. Heuft et al.
U.S. Appl. No. 12/716,324, filed Mar. 3, 2010 Matthew A. Heuft et al.
U.S. Appl. No. 12/716,686, filed Mar. 3, 2010 Matthew A. Heuft et al.
U.S. Appl. No. 12/716,449, filed Mar. 3, 2010 Adrien Pierre Cote et al.
Cassie, A.B.D. et al., "Wettability of Porous Surfaces," Trans. Faraday Soc., vol. 40, pp. 546-551, Jun. 1944.
U.S. Appl. No. 12/854,962, filed Aug. 12, 2010 Matthew A. Heuft et al.
U.S. Appl. No. 12/815,688, filed Jun. 15, 2010 Adrien P. Cote et al.
U.S. Appl. No. 12/854,957, filed Aug. 12, 2010 Matthew A. Heuft et al.
U.S. Appl. No. 12/845,053, filed Jul. 28, 2010 Adrien P. Cote et al.
U.S. Appl. No. 12/845,235, filed Jul. 28, 2010 Adrien P. Cote et al.
U.S. Appl. No. 12/566,568, filed Sep. 24, 2009 Eugene M. Chow et al.
U.S. Appl. No. 12/566,518, filed Sep. 24, 2009 Eugene M. Chow et al.
U.S. Appl. No. 12/716,706, filed Mar. 3, 2010 Adrien Pierre Cote et al.
U.S. Appl. No. 12/845,052, filed Jul. 28, 2010 Adrien Pierre Cote et al.
Colson et al. "Oriented 2D Covalent Organic Framework Thin Films on Single-Layer Graphene", *Science*, 332, 228-231 (2011).
K.S. Novoselov et al., "Electric Field Effect in Atomically Thin Carbon Films", *Science*, Oct. 22, 2004, pp. 666-669, vol. 306.
Stankovich et al., "Graphene-Based Composite Materials", *Nature*, Jul. 20, 2006, pp. 282-286, vol. 442.
U.S. Appl. No. 13/173,948, filed Jun. 30, 2011 Adrien Pierre Cote et al.
U.S. Appl. No. 13/042,950, filed Mar. 8, 2011 Adrien Pierre Cote et al.
U.S. Appl. No. 13/181,912, filed Jul. 13, 2011 Adrien Pierre Cote et al.
U.S. Appl. No. 13/174,046, filed Jun. 30, 2011 Matthew A. Heuft et al.

U.S. Appl. No. 13/182,047, filed Jul. 13, 2011 Adrien Pierre Cote et al.
Jun. 1, 2011 Office Action issued in U.S. Appl. No. 12/716,524.
Peter M. Budd; Putting Order into Polymer Networks; Science, 2007, 316, 210-211.
Wan, S., Guo, J., Kim, J., Ihee, H. and Jiang, D.; A Photoconductive Covalent Organic Framework: Self-Condensed Arene Cubes Composed of Eclipsed 2D Polypyrene Sheets for Photocurrent Generation; Angewandte Chemie International Edition, 2009, 48, 5439-5442.
U.S. Appl. No. 13/351,561, filed Jan. 17, 2012 Matthew A. Heuft et al.
U.S. Appl. No. 13/246,109, filed Sep. 27, 2011 Matthew A. Heuft et al.
U.S. Appl. No. 13/246,268, filed Sep. 27, 2011 Matthew A. Heuft et al.
U.S. Appl. No. 13/351,589, filed Jan. 17, 2012 Matthew A. Heuft et al.
Nov. 14, 2011 Notice of Allowance issued in U.S. Appl. No. 12/854,957.
Nov. 14, 2011 Notice of Allowance issued in U.S. Appl. No. 12/854,962.
Sep. 26, 2011 Office Action issued in U.S. Appl. No. 12/854,962.
Sep. 27, 2011 Office Action issued in U.S. Appl. No. 12/854,957.
Nov. 21, 2011 Office Action issued in U.S. Appl. No. 12/815,688.
Feb. 7, 2012 Office Action issued in U.S. Appl. No. 13/173,948.
Sep. 19, 2011 Notice of Allowance issued in U.S. Appl. No. 12/716,524.
Mar. 29, 2012 Office Action issued in U.S. Appl. No. 12/845,235.
Apr. 6, 2012 Office Action issued in U.S. Appl. No. 13/315,452.
May 16, 2012 Notice of Allowance issued in U.S. Appl. No. 13/173,948.

* cited by examiner

IDEAL ROD BUILDING BLOCK

IDEAL ROD BUILDING BLOCK

DISTORTED ROD BUILDING BLOCK

DISTORTED ROD BUILDING BLOCK

IDEAL TRIANGULAR BUILDING BLOCK

IDEAL TRIANGULAR BUILDING BLOCK

DISTORTED TRIANGULAR BUILDING BLOCK

DISTORTED TRIANGULAR BUILDING BLOCK

IDEAL TETRAHEDRAL BUILDING BLOCK

IDEAL TETRAHEDRAL BUILDING BLOCK

DISTORTED TETRAHEDRAL BUILDING BLOCK

DISTORTED TETRAHEDRAL BUILDING BLOCK

IDEAL SQUARE BUILDING BLOCK

DISTORTED SQUARE/TETRAHEDRAL BUILDING BLOCK

DISTORTED SQUARE/TETRAHEDRA BUILDING BLOCK

POROUS STRUCTURED ORGANIC FILM COMPOSITIONS

CROSS-REFERENCE TO RELATED APPLICATIONS

This nonprovisional application is related to U.S. patent application Ser. Nos. 12/716,524, now U.S. Pat. No. 8,093, 347; 12/716,449; 12/716,706; 12/716,324; 12/716,686; 12/716,571; 12/815,688; 12/845,053; 12/845,235; 12/854, 962 now U.S. Pat. No. 8,119,315; 12/854,957, now U.S. Pat. Nos. 8,119,314; and 12/845,052 entitled "Structured Organic Films," "Structured Organic Films Having an Added Functionality," "Mixed Solvent Process for Preparing Structured Organic Films," "Composite Structured Organic Films," "Process For Preparing Structured Organic Films (SOFs) Via a Pre-SOF," "Electronic Devices Comprising Structured Organic Films," "Periodic Structured Organic Films," "Capped Structured Organic Film Compositions," "Imaging Members Comprising Capped Structured Organic Film Compositions," "Imaging Members for Ink-Based Digital Printing Comprising Structured Organic Films," "Imaging Devices Comprising Structured Organic Films," and "Imaging Members Comprising Structured Organic Films," respectively; and U.S. Provisional Application No. 61/157,411, entitled "Structured Organic Films" filed Mar. 4, 2009, the disclosures of which are totally incorporated herein by reference in their entireties.

BACKGROUND OF THE INVENTION

Porous materials have a comparatively large specific surface area, and thus can adsorb large quantities of gas or small organic molecules. Such porous materials may be useful for applications including gas storage, gas separation, ion transport membranes and, in general, applications where trapping or transporting a chemical entity through a material is required. Additionally, porous materials may be useful for other applications, such as dielectrics, novel composites (e.g. P/R, fusing, drug release), supercapacitors, or catalysis. Most permanently porous materials are usually inorganic compounds, obtained as refractory powders that need to be imbedded into other materials to create films so they can be appropriated for device integration (e.g. electronics, fuel cells, batteries, gas separation membranes, etc.).

Typical porous materials comprise macroporous materials having pore size less than 2 nm, mesoporous materials having pore size between 2 nm and 50 nm, and macroporous materials having pore size bigger than 50 nm. In 1995, Omar Yaghi synthesized the MOF (metal-organic-framework) (referring to Nature, 1995, (378), 703), a metal-organic coordination polymer that is really close to practical application. As a new functional molecular material, the MOF not only has a crystal structure similar to the zeolite molecular sieve, but also its structure is capable of being designed. The MOF can obtain nano-size pore channels and cavities by directionally designing the topological structure and expanding the organic functional groups. However, the MOF has a comparative poor chemical stability. In 2005, Omar Yaghi disclosed the COF (covalent organic framework) (referring to Science, 2005, (310), 1166), an organic porous framework material, which is composed of light elements (C, H, O, B) being connected via covalent bonds. However, the chemical stability problem is not really solved.

COFs, differ from polymers/cross-linked polymers in that COFs are intended to be highly patterned. In COF chemistry molecular components are called molecular building blocks rather than monomers. During COF synthesis molecular building blocks react to form two- or three-dimensional networks. Consequently, molecular building blocks are patterned throughout COF materials and molecular building blocks are linked to each other through strong covalent bonds.

COFs developed thus far are typically powders with high porosity and are materials with exceptionally low density. COFs can store near-record amounts of argon and nitrogen. While these conventional COFs are useful, there is a need, addressed by embodiments of the present invention, for new materials that offer advantages over conventional COFs in terms of enhanced characteristics.

The properties and characteristics of conventional COFs are described in the following documents:

Yaghi et al., U.S. Pat. No. 7,582,798;
Yaghi et al., U.S. Pat. No. 7,196,210;
Shun Wan et al., "A Belt-Shaped, Blue Luminescent, and Semiconducting Covalent Organic Framework," Angew. Chem. Int. Ed., Vol. 47, pp. 8826-8830 (published on web Jan. 10, 2008);
Nikolas A. A. Zwaneveld et al., "Organized Formation of 2D Extended Covalent Organic Frameworks at Surfaces," J. Am. Chem. Soc., Vol. 130, pp. 6678-6679 (published on web Apr. 30, 2008);
Adrien P. Cote et al., "Porous, Crystalline, Covalent Organic Frameworks," Science, Vol. 310, pp. 1166-1170 (Nov. 18, 2005);
Hani El-Kaderi et al., "Designed Synthesis of 3D Covalent Organic Frameworks," Science, Vol. 316, pp. 268-272 (Apr. 13, 2007);
Adrien P. Cote et al., "Reticular Synthesis of Microporous and Mesoporous Covalent Organic Frameworks" J. Am. Chem. Soc., Vol. 129, 12914-12915 (published on web Oct. 6, 2007);
Omar M. Yaghi et al., "Reticular synthesis and the design of new materials," Nature, Vol. 423, pp. 705-714 (Jun. 12, 2003);
Nathan W. Ockwig et al., "Reticular Chemistry: Occurrence and Taxonomy of Nets and Grammar for the Design of Frameworks," Acc. Chem. Res., Vol. 38, No. 3, pp. 176-182 (published on web Jan. 19, 2005);
Pierre Kuhn et al., 'Porous, Covalent Triazine-Based Frameworks Prepared by Ionothermal Synthesis," Angew. Chem. Mt. Ed., Vol. 47, pp. 3450-3453. (Published on web Mar. 10, 2008);
Jia-Xing Jiang et al., "Conjugated Microporous Poly(aryleneethylnylene) Networks," Angew. Chem. Int. Ed., Vol. 46, (2008) pp, 1-5 (Published on web Sep. 26, 2008); and
Hunt, J. R. et al. "Reticular Synthesis of Covalent-Organic Borosilicate Frameworks" J. Am. Chem. Soc., Vol. 130, (2008), 11872-11873. (published on web Aug. 16, 2008); and
Colson et al. "Oriented 2D Covalent Organic Framework Thin Films on Single-Layer" Science, 332, 228-231 (2011).

Gas storage materials that are being developed are currently powders that need to be compacted or shaped and subsequently inserted into cylindrical containers for use. Considerable benefit in optimizing the storage system geometry and footprint can be accessed if the gas storage material were in a form other than a powder, such as a film. Thus, improvements are still needed over the conventional porous materials.

SUMMARY OF THE DISCLOSURE

There is provided in embodiments a porous structured organic film (SOF) comprising a plurality of segments including at least a first segment type and a plurality of linkers including at least a first linker type arranged as a covalent organic framework (COF), and a plurality of pores, wherein the first segment type and/or the first linker type comprises at least one atom that is not carbon and the plurality of pores comprises a plurality of sites accessible to one or more molecular or atomic entity.

BRIEF DESCRIPTION OF THE DRAWINGS

Other aspects of the present disclosure will become apparent as the following description proceeds and upon reference to the following figures which represent illustrative embodiments.

DETAILED DESCRIPTION

Figure 1A:
FIG. 1A-O are illustrations of exemplary building blocks whose symmetrical elements are outlined.
Figure 1B:
Figure 1C:
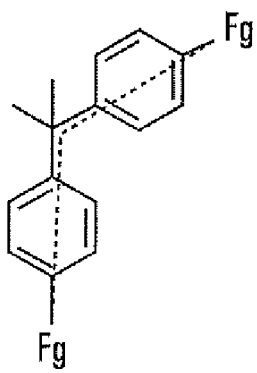
Figure 1D:
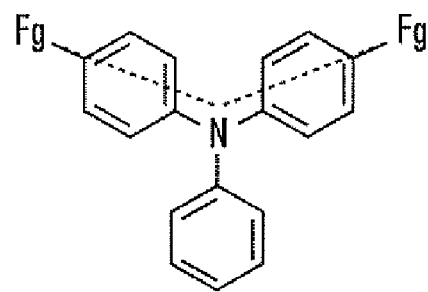
Figure 1E:
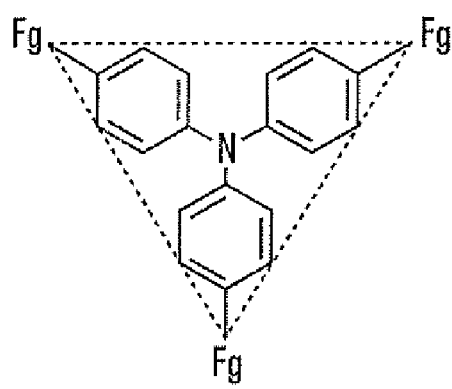
Figure 1F:
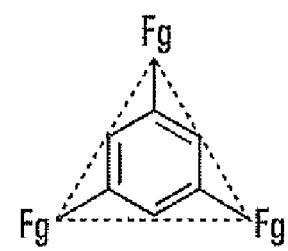
Figure 1G:
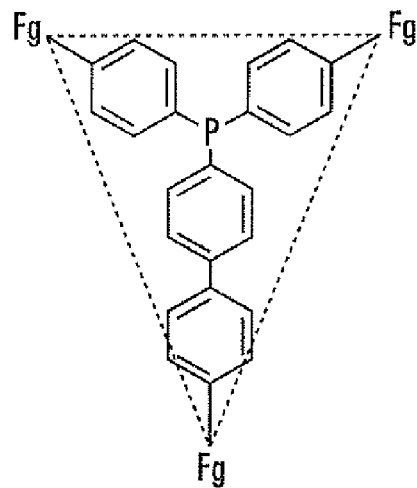
Figure 1H:
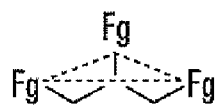
Figure 1I:
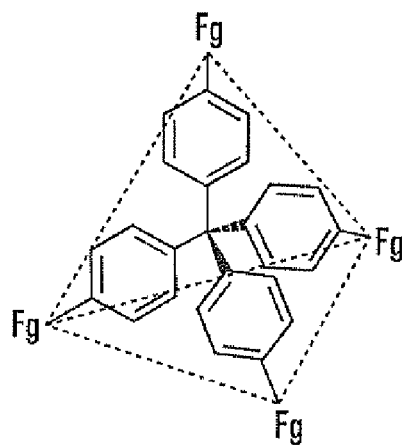
Figure 1J:
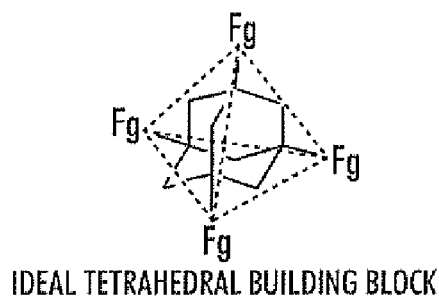
Figure 1K:
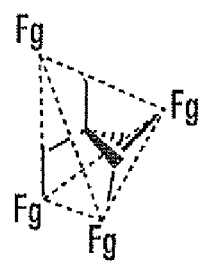
Figure 1L:
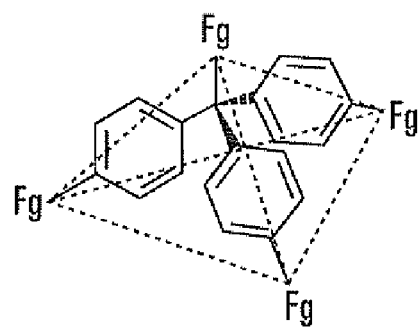
Figure 1M:
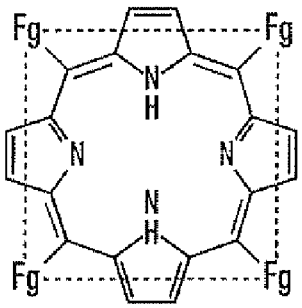
Figure 1N:
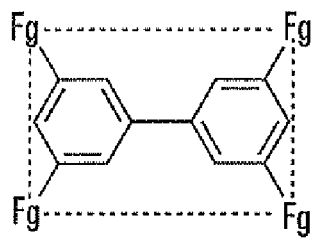

In this specification and the claims that follow, singular forms such as "a," "an," and "the" include plural forms unless the content clearly dictates otherwise.

The term "SOF" or "SOF composition" generally refers to a covalent organic framework (COF) that is a film at a macroscopic level. However, as used in the present disclosure the term "SOF" does not encompass graphite, graphene, and/or diamond. The phrase "macroscopic level" refers, for example, to the naked eye view of the present SOFs. Although COFs are a network at the "microscopic level" or "molecular level" (requiring use of powerful magnifying equipment or as assessed using scattering methods), the present SOF is fundamentally different at the "macroscopic level" because the film is for instance orders of magnitude larger in coverage than a microscopic level COF network. SOFs described herein that may be used in the embodiments described herein are solvent resistant and have macroscopic morphologies much different than typical COFs previously synthesized.

As used herein, "sorption" is a general term that refers, for example, to a process resulting in the association of atoms or molecules with a target material. Sorption includes both adsorption and absorption. Absorption refers to a process in which atoms or molecules move into the bulk of a porous material, such as the absorption of water by a sponge. Adsorption refers to a process in which atoms or molecules move from a bulk phase (that is, solid, liquid, or gas) onto a solid or liquid surface. The term adsorption may be used in the context of solid surfaces in contact with liquids and gases. Molecules that have been adsorbed onto solid surfaces are referred to generically as adsorbates, and the surface to which they are adsorbed as the substrate or adsorbent. Adsorption is usually described through isotherms, that is, functions that connect the amount of adsorbate on the adsorbent, with its pressure (if gas) or concentration (if liquid). In general, desorption refers to the reverse of adsorption, and is a process in which molecules adsorbed on a surface are transferred back into a bulk phase.

The porous SOF(s) of the present disclosure can be used for a variety of applications where storing (and optionally releasing) a chemical entity, trapping (and optionally releasing) a chemical entity, selecting or purifying (and optionally releasing) a specific chemical entity, and/or transporting a chemical entity may be desired or required. The SOFs of the present disclosure offer considerable opportunity to access beneficial designs for gas storage systems, especially for mobile applications.

The term "entity" refers, for example, to one or more chemical entities, such as atoms (i.e., an atomic entity) and/or molecules (i.e., a molecular entity), and/or biological substances (i.e., a biological entity); including ions and radicals thereof, and/or various phases (gas, liquid, super critical fluid, and/or solid) of such atoms, molecules and/or biological substances.

The term "gaseous entity" refers, for example, one or more atoms, molecules and/or biological substances, including ions and radicals thereof, that may be introduced into the gas phase, either with or without the aid of increased temperature and/or reduced pressure, such as gaseous chemical entities.

The term "gaseous chemical entity" refers, for example, one or more atoms, molecules, including ions and radicals thereof, that may be introduced into the gas phase, either with or without the aid of increased temperature and/or reduced pressure.

The term "uptake" refers, for example, to a process resulting in the association of an entity, such as target chemical entity, with a sorbent material, such as a sorbent material tailored to selectively associate with the target chemical entity.

The porous SOF(s) of the present disclosure may be used to adsorb or absorb one or more chemical entities (or chemical species) and/or biological entities. The porous SOF(s) of the present disclosure may be exposed to conditions under which the chemical entities and/or biological entities are desorbed from the porous SOF(s).

In embodiments, the porous SOF(s) of the present disclosure may be incorporated into devices for the uptake of a chemical entity and/or biological entity. In embodiments, the porous SOF(s) of the present disclosure may be incorporated into devices for the uptake of one or more types of chemical entities and/or biological entities.

In embodiments, the present disclosure provides a device that may include a sorbent material comprising at least one porous SOF of the present disclosure. In embodiments, the uptake of chemical entities and/or biological entities into the sorbent material, such as a sorbent material comprising at least one porous SOF, may be reversible or non-reversible.

In embodiments, the sorbent material, such as a sorbent material comprising at least one porous SOF, in the device may be included in discrete layers. In embodiments, the sorbent material, such as a sorbent material comprising at least one porous SOF, in the device may be embedded into or fixed to a solid liquid- and/or gas-permeable three-dimensional support, which may or may not be a SOF. In embodiments, the sorbent material, such as a sorbent material comprising at least one porous SOF, may have pores for the reversible uptake or storage of liquids, gases or supercritical fluids. In embodiments, the sorbent material, such as a sorbent material comprising at least one porous SOF, of the present disclosure may reversibly adsorb or absorb liquids, gases or supercritical fluids.

In embodiments, a device provided herein comprises a storage unit for the storage of chemical entities, such as, gases and small molecules including, for example, ammonia, carbon dioxide, carbon monoxide, hydrogen, amines, methane, natural gas, oxygen, argon, nitrogen, and/or argon, and/or other larger molecules such as those commonly known as volatile organic compounds (VOCs), alkanes, petroleum, halogenated hydrocarbons and/or biological entities such as microorganisms, spores, viruses, prions, and mixtures thereof. Certain embodiments may also comprise a storage system for mixtures of chemical entities. In embodiments, the chemical entities and/or biological entities may be stored in the SOFs of the present disclosure for a predetermined time, such as predetermined number of seconds, minutes, hours, days or years.

Adsorptive gas storage relies on the physical phenomena wherein any surface will, in an energetically favorable means, adsorb gas molecules. If a material that is created that has internal surface area (i.e. porous) it has a much greater capacity to hold onto gas molecules than a dense material with just external surface area. In a gas storage system it is desirable to store large amounts of gasses at lowered pressures for safety reasons. Porous adsorbents are pursued for hydrogen and methane gas storage systems for vehicular and mobile applications because their internal surface areas have the ability, via the aforementioned adsorptive process, to concentrate gases at pressures lower than a gas' natural compressibility.

The term "natural compressibility" of a gas refers, for example, to the nominal behavior of a gas when put under increased pressure. Under compression the concentration of gaseous entities increases: within a given volume there it is possible to store more gaseous entities at a higher pressure than at a lowered pressure. It is well known in the art that a porous material has the ability to further concentrate gaseous entities at a given pressure by offering adsorptive sites within its internal surfaces. Thus within pore volume of a porous material it is possible to concentrate a gaseous entity beyond its natural compressibility.

In embodiments, the gaseous chemical entity is present in the SOF at a concentration from about 1.05 times greater than the natural compressibility of the gaseous chemical entity to about the concentration of the gaseous chemical entity upon its liquification, such as from about 1.1 times greater than the natural compressibility of the gaseous chemical entity to about the concentration of the gaseous chemical entity upon its liquification, or from about 1.5 times greater than the natural compressibility of the gaseous chemical entity to about the concentration of the gaseous chemical entity upon its liquification.

Unlike conventional adsorptive powders, which generally require a cylindrical tank, the porous SOFs of the present disclosure are not limited in their applicability for mobile applications. For example, the porous SOFs of the present disclosure may be present in alternate geometries for gas storage systems such that the porous SOFs of the present disclosure can be seamlessly integrated into the device/vehicle because SOFs can be conformably introduced to the vehicular system (e.g. integrated into structural components), or alternatively SOFs sheets can be adapted to function as storage material included in current storage geometries, such as cylindrical tanks or the like.

In embodiments, methods for the uptake of chemical entities and/or biological entities into sorbent material(s) comprising at least one porous SOF are provided. In embodiments, methods for the uptake of chemical entities and/or biological entities into sorbent material(s) comprising at least one porous SOF are provided such that the chemical entities and/or biological entities may be stored in the sorbent material(s) comprising at least one porous SOF. In embodiments, the methods of the present disclosure include contacting a sorbent material that includes at least one porous SOF of the present disclosure with chemical entities and/or biological entities. In embodiments, the uptake of the chemical entities and/or biological entities may include storage of the chemical entities and/or biological entities. In embodiments, the chemical entities and/or biological entities are stored under conditions suitable for use as an energy source.

In embodiments, the chemical entity utilized in the methods of the present disclosure may comprise a mixture of one or more target chemical entities and various non-target chemical entities.

In embodiments the target chemical entity may be one or more substance selected from the group consisting of ammonia, halogens, noble gasses, methane, natural gas, water, nitrogen, oxygen, sulfur, hydrogen sulfide, thiophenes, sulfur dioxide, carbon dioxide, carbon monoxide, hydrogen, lithium, ketones, esters, normal alkanes, branched alkanes, cyclic alkanes, polycyclic alkanes, arenes, waxes, sulfoxides, mecaptans, sulfides, disulfides, organoamines, nitrogen heterocycles, alcohols, carboxylic acids, sulfonic acids, nitrogen oxides, sulfur oxides, mineral acids, peptides, pharmaceutical molecules or agents, elements from the periodic table belonging to Group 8, Group 9, Group 10, Group 11, and Group 12; and combinations thereof.

As used herein "pharmaceutical molecules or agents" are any compound that has or can have a therapeutic effect upon a disease, condition or disorder, such as inorganic and/or organic substances including carbohydrates, cofactors, fats, lipids, minerals, nucleic acids, antibiotics, vitamins, blood thinners, and proteins. In embodiments, the pharmaceutical molecules or agents, are those containing at least one functional group having a disproportionately high affinity for the one or more sites in the plurality of pores in the SOF, such as pharmaceutical molecules or agents containing at least one functional group having a disproportionately high affinity for the one or more functionalized sites existing in the plurality of pores of the SOF.

In embodiments, the porous SOFs of the present disclosure may comprise a plurality of pores having a plurality of accessible sites for selective uptake of the target chemical entity. In further embodiments, the methods of the present disclosure may include contacting a chemical entity with a sorbent material by diffusing the one or more target chemical entities into the plurality of accessible sites for the selective uptake of the one or more target chemical entities. In embodiments, the one or more target chemical entities may be contaminant(s).

In specific embodiments, the non-target chemical entities may comprise a composition of molecules where purification is desired. For example, in the methods of the present disclosure the non-target chemical entities may comprise water, and the step of contacting the chemical entity with a sorbent material may include contacting an aqueous feed stream with the sorbent material and diffusing the water through the sorbent material in order to purify the water by selectively uptake the one or more target chemical entities, which may be contaminants.

In embodiments, methods are provided for the uptake of chemical entities that include contacting a device comprising a porous SOF of the present disclosure with the chemical entities.

In embodiments, the segments of the SOFs of the present disclosure may be functionalized in order to create sites with a desired property (such as, for example, a specific electric or steric property). This ability of SOFs to be functionalized is useful in many storage, separation, and/or catalytic applications because the pores may be lined with a high concentration of ordered sites whose properties, such as hydrophobic, hydrophilic, polar, non-polar, electronic, steric properties, as well as other properties that may be varied in SOFs (as described below), can be tailored by functionalization of the segments and linkers of the SOF.

The porous SOFs of the present disclosure have advantages over both of inorganic zeolites and of MOFs (such as higher stability and particularly hydrolytic stability), and thus may be applied to highly efficient catalysis, separations and storage applications. In embodiments, the porous SOFs of the present disclosure may possess a nanoporous structure useful for filtration, gas storage and the like. In embodiments pore sizes may range from about 4 Angstroms to about 40 Angstroms, such as from about 6 Angstroms to about 30 Angstroms, or from about 7 Angstroms to 20 Angstroms. In embodiments, the porous SOFs have exceptional chemical stability, exceeding MOFs and COFs, in refluxing polar solvents, non-polar solvents, acidic solvents, basic solvents, organic solvents, and water.

In embodiments, the building blocks that are reacted to fault the porous SOF may provide organically lined cages and channels of a predetermined size and shape. In embodiments, specific building blocks may be selected and/or further functionalized such that function groups line the cages and channels, and/or the pores. In embodiments, specific building blocks may be selected and/or further functionalized such that a desired SOF structure with a predetermined pore size is obtained.

For example, the porous SOFs of the disclosure may comprise one or more of the following characteristics: a surface area of the plurality of pores is greater than about 75 $m^2/g$; a surface area of the plurality of pores is about 75 to about 3500 $m^2/g$; a surface area of the plurality of pores is about 150 to about 2000 $m^2/g$; an average pore volume of the plurality of pores comprising the porous SOF is in the range from about 0.05 to about 1.7 $cm^3/g$, such as about 0.1 to about 1.6 $cm^3/g$; the framework of the porous SOF has a density in a range of from about 0.3 to about 1.5 $g/cm^3$.

In embodiments, the porous SOFs of the disclosure comprise a thermal stability range of at least up to 200° C., or a thermal stability range of at least up to 300° C., such as a thermal stability range of greater than about 250 to about 700° C., such as a thermal stability range of greater than from about 300 to about 450° C. In embodiments, the porous SOFs of the disclosure comprise a Langmuir surface area of about 75 $m^2/g$ to about 3500 $m^2/g$.

In embodiments, a gas storage and/or separation material comprising a porous SOF is provided. In embodiments, a porous SOF of the present disclosure may include one or more sites for storing or separating gas molecules. For example, the building blocks may be functionalized such that function groups of the SOFs form the one or more sites for storing or separating gas molecules. In embodiments, the gases that may be stored in the gas storage material of the present disclosure may include polar gases, nonpolar gases, and/or gas molecules comprising available electron density for attachment to the one or more sites on the surface area of a pore of the porous SOF. Such electron density may include molecules having multiple bonds between two atoms contained therein or molecules having a lone pair of electrons. Suitable examples of such gases include, but are not limited to, the gases comprising a component selected from the group consisting of ammonia, argon, methane, natural gas, water, nitrogen, oxygen, hydrogen sulfide, thiophene, sulfur dioxide, carbon dioxide, carbon monoxide, hydrogen, and combinations thereof.

In embodiments, porous SOFs may be used to store chemical entities (gases, hydrocarbons, molecules, atoms, and the like). The storage capacity of the porous SOFs may be described in terms of the percentage of the available pore volume that is occupied by chemical entities. For example, when the entire available pore structure of a porous SOF is occupied then the SOF may be described as being at 100% filling or storage capacity. The pore volume of an SOF may be defined, for example, as the ratio of the volume of pores/mass of SOF ($cm^3/g$), and this quantity may be determined from gas adsorption measurements. The volume of the SOF pore structure occupied by a chemical entity can be determined by measuring the mass change of a porous SOF upon its exposure to a chemical entity and calculating the corresponding volume of chemical entity by using known or calculated values of molecular volume. Any degree of filling capacity may be selected for the porous SOFs of the present disclosure. In embodiments, a loaded porous SOF-based chemical entity storage system may have a filling capacity in the range of from about 40% to about 100%, or about 60% or about 100%, or about 80 to about 95%.

In embodiments, the gas storage material comprising a porous SOF may be a material that may also be used to separate the desired gas from a gaseous mixture, such as a gas storage material that may be used to collect the gas (from a gaseous mixture) that is to be stored. For example, in embodiments, the gas storage material comprising a porous SOF is a hydrogen storage material that is used to store hydrogen ($H_2$), and optionally the gas storage material comprising a porous SOF is a $H_2$ storage material that may be used to separate (from a gaseous mixture) the $H_2$ gas to be stored. In embodiments, the gas storage material may be a carbon dioxide ($CO_2$) storage material, such as a $CO_2$ storage material that may be used to separate (from a gaseous mixture) the $CO_2$ to be stored.

In contrast to conventional gas separation processes, which use powders that need to be imbedded into other materials or compacted into shaped bodies, the porous SOFs of the present disclosure may be directly formed in the shape of a film so they can be employed in processes, such as pressure swing adsorption, without further processing, if desired.

Pressure swing adsorption (PSA) processes rely on the fact that under pressure, gases tend to be attracted to solid surfaces, or "adsorbed". PSA procedures, processes and apparatus are disclosed in U.S. Pat. Nos. 3,430,418; 4,917,711; 6,340,382; 6,464,756; and 5,300,271, and U.S. Patent Application Publication Nos. 2003/0126989, 2003/0172808, 2005/0257685, 2006/0236862, and 2011/0011128, the disclosures of which are incorporated by reference in their entireties. The higher the pressure, the more gas is adsorbed; when the pressure is reduced, the gas is released, or desorbed. PSA processes can be used to separate gases in a mixture because different gases tend to be attracted to different solid surfaces more or less strongly. If a gas mixture such as air, for example, is passed under pressure through a vessel containing an adsorbent bed that attracts nitrogen more strongly than it does oxygen, part or all of the nitrogen will stay in the bed, and the gas coming out of the vessel will be enriched in oxygen.

Pressure swing adsorption processes selectively 'filter' gas molecules by using a porous material's (adsorbant) inherent affinity toward gasses. The methods, materials, compositions, devices, and systems of the present disclosure allow for the achievement of a substantial improvement in pressure swing adsorption process by employing an sorbent bed comprising a porous SOF that interacts with gas molecules, where the sorbent bed comprising a porous SOF is in the form of a permanently porous membrane or film rather than a powder.

In embodiments, when a bed comprising a porous SOF of the present disclosure reaches the end of its capacity to adsorb a gas, such as nitrogen, it can be regenerated by reducing the pressure, thereby releasing the adsorbed gas, such as nitrogen. It is then ready for another cycle of producing a product enriched with the target gas, such as oxygen enriched air. This is exactly the process used in portable oxygen concentrators used by emphysema patients and others who require oxygen enriched air to breathe. PSA is currently limited by using powder adsorbents. For example, in the adsorption bed considerable 'dead space' exists between particles where no selective adsorption takes place. Thus, to accommodate the optimal mass of the required adsorbent large volumes are required. Replacing powders with a membrane comprising a porous SOF allows for more efficient compaction of the adsorbent (e.g. rolling/folding/stacking) opening options for new and smaller geometries/footprints for PSA processes, which, in particular, benefit mobile/portable gas separation devices (e.g. oxygen concentrators).

In embodiments, the porous SOFs of the present disclosure may be directly formed in a desired shape, such as a film, so they can be employed in processes, such as a reverse osmosis process, without further processing, if desired. Reverse osmosis is the process of forcing a solvent from a region of high solute concentration through a membrane to a region of low solute concentration by applying a pressure in excess of the osmotic pressure. This is the reverse of an osmosis process, which is the natural movement of solvent from an area of low solute concentration, through a membrane, to an area of high solute concentration when no external pressure is applied. In embodiments, the porous SOFs of the present disclosure may be semipermeable, meaning they allow for the passage of solvent but not of solute. In embodiments, porous SOFs of the present disclosure may be a membrane for reverse osmosis, such as a membrane having a dense barrier layer in where most separation occurs. The porous SOF membrane may be designed to allow only water to pass through this dense layer while preventing the passage of solutes, such as salts. The reverse osmosis process generally requires that a high pressure be exerted on the high concentration side of the membrane, usually 2-17 bar (30-250 psi) compositions such as fresh and brackish water, and 40-70 bar (600-1000 psi) for seawater, which has around 24 bar (350 psi) natural osmotic pressure which must be overcome.

In embodiments, at least one of the porous SOFs of the present disclosure may form a single layer or multilayer membrane. In embodiments, a membrane comprising a porous SOF, which may be one or more substantially pinhole-free SOFs or pinhole-free SOFs, may be used in conjunction with other membranes or with other gas separation techniques if desired, e.g. with solvent absorption (e.g. Selexol, Rectisol, Sulfinol, Benfield), amine absorption (e.g. DEA, MDEA), physical adsorption, cryogenic techniques, etc. In embodiments, the membranes comprising a porous SOF of the present disclosure are tailored (by, for example selecting specific components, such as building blocks, with known affinities for the target species) for separating a feed gas containing a target gas into a gas stream rich in the target gas and a gas stream depleted in the target gas. For example, membranes comprising a porous SOF of the present disclosure may be used to separate a feed gas comprising polar and non-polar gases into a gas stream rich in polar gases and a gas stream depleted in polar gases.

In embodiments, the target gas may be, for example, a gas which has value to the user of the membrane and which the user wishes to collect. In alternative embodiments, the target gas may be an undesirable gas, e.g. a pollutant or contaminate, which the user wishes to separate from a gas stream, such as to purify the gas stream or in order to protect the environment.

In embodiments, membranes comprising porous SOFs may be used for purifying natural gas (a mixture which predominantly comprises methane) by removing polar gases ($CO_2$, $H_2S$); for purifying synthesis gas; and for removing $CO_2$ from hydrogen and from flue gases. Flue gases typically arise from fireplaces, ovens, furnaces, boilers, combustion engines and power plants. The composition of flue gases depend on what is being burned, but usually they contain mostly nitrogen (typically more than two-thirds) derived from air, carbon dioxide ($CO_2$) derived from combustion and water vapour as well as oxygen. Flue gases also contain a small percentage of pollutants such as particulate matter, carbon monoxide, nitrogen oxides and sulphur oxides.

In embodiments, the methods of separation of the present disclosure, which employ membranes comprising porous SOFs, may be useful for separating a feed gas comprising a target gas into a product gas stream richer in the target gas than the feed gas and a waste gas stream poorer in target gas than the feed gas (which may be recycled through the separation process.

In embodiments, the methods of separation of the present disclosure may comprise measuring adsorption isotherms of one or more of the gases to be separated and/or stored with various porous SOF compositions. For example, for separation of $CO_2$ from a gaseous mixture, such as an exemplary gaseous mixture comprising $CO_2$, methane, carbon monoxide and nitrogen, adsorption isotherms may be measured for each of the gases with various porous SOF compositions. Then a particular porous SOF composition may be selected that has a disproportionately high (or low) affinity and capacity for the desired gas (such as $CO_2$) to be separated and/or stored.

In embodiments, a gaseous mixture may be filtered or separated via a filtration/separation column comprising a porous SOF having a disproportionately high affinity and capacity (or a disproportionately low affinity and capacity) for a desired chemical entity. The affinity of a particular gas for an SOF can be determined by measuring the isosteric heat of adsorption at zero coverage as is commonly practiced in the art. For example, such a column may comprise a porous SOF composition capable of separating $CO_2$ from other gaseous components in a multi-component gas. In embodiments, such a column may comprise a porous SOF composition capable of separating a particular isomer (such as a hydrocarbon isomer (e.g., butane isomers) and/or a xylene isomer) from other gaseous components in a multi-component gas. In embodiments, the porous SOF may be specifically designed to have a disproportionately high selectivity, affinity and/or capacity for a particular component of a mixture, such as a gaseous mixture. In embodiments, the porous SOF may be designed to have a disproportionately high selectivity, affinity and/or capacity for each component in a mixture other than the desired component of the mixture, such as a gaseous mixture.

In embodiments, the porous SOFs of the present disclosure may be incorporated into membranes, such as used in batteries, fuel cells, water purification, etc.). In embodiments, the methods of separation of the present disclosure will result in a retentate that may be referred to as being "depleted" of a predetermined component. In embodiments, the methods of separation of the present disclosure will result in effluent stream that may possess the desired product. In embodiments, this disclosure provides an apparatus and method for separating one or more components from a multi-component mixtures, such as a gasous mixture, using a separation system having a feed side and an effluent side separated by a porous SOF composition. In embodiments, the porous SOF composition may be present in a column.

In embodiments, a gas storage material comprising a porous SOF is provided. Gases that may be stored or separated by the methods, compositions and systems of the present disclosure include polar gas molecules, nonpolar gas molecules, and gas molecules comprising available electron density for attachment to the one or more sites. Such electron density includes molecules having multiple bonds between two atoms contained therein or molecules having a lone pair of electrons. Suitable examples of such gases may include the gases comprising a component selected from the group consisting of ammonia, argon, carbon dioxide, carbon monoxide, hydrogen, and combinations thereof. In embodiments, the gas binding material comprising a porous SOF possesses binding sites that may be used to separate the desired gas, such as carbon dioxide, from a gaseous mixture.

In embodiments, the gaseous storage site comprises a pore in a SOF that is functionalized with a group having a desired size or charge. In embodiments, such a group may be a part of the segment and/or linker. In embodiments, this group may be part of a capped SOF.

In embodiments, the porous SOFs of this disclosure include a plurality of pores for gas adsorption. In embodiments, the plurality of pores have a unimodal size distribution. In embodiments, the plurality of pores has a multimodal (e.g., bimodal, trimodal, etc.) size distribution.

In embodiments, the porous SOFs of the present disclosure may be incorporated into chemical sensors (e.g. resistometric sensors) capable of sensing the presence of an analyte of interest. There is considerable interest in developing sensors that act as analogs of the mammalian olfactory system. However, may such sensor systems are easily contaminated. The porous structures of the disclosure provide a defined interaction area that limits the ability of contaminate to contact a sensor material that passes through the porous structure of the SOF.

In embodiments, sensor systems of the present disclosure may include conductive SOFs, SOFs with conductive regions and non-conductive regions and non-conductive SOFs. In resistometric systems of the present disclosure, conductive leads are separated by the conductive SOFs such that a current traverses between the leads and through the sensor material. Upon binding to an analyte, the resistance in the material changes and detectable signal is thus generated. Using the porous SOFs of the present disclosure, the area surrounding the sensor material is limited and serves as a "filter" to limit contaminants from contacting the sensor material, which may be an SOF, thus increasing sensor specificity.

In embodiments, the porous SOF comprises a plurality of segments, a plurality of linkers arranged as a covalent organic framework (COF), such as a "solvent resistant" SOF, a capped SOF, a composite SOF, and/or a periodic SOF. The term "solvent resistant" refers, for example, to the substantial absence of (1) any leaching out any atoms and/or molecules that were at one time part of the SOF and/or SOF composition (such as a composite SOF), and/or (2) any phase separation of any molecules that were at one time part of the SOF and/or SOF composition (such as a composite SOF), that increases the susceptibility of the layer into which the SOF is incorporated to solvent/stress cracking or degradation. The term "substantial absence" refers for example, to less than about 0.5% of the atoms and/or molecules of the SOF being leached out after continuously immersing the SOF in a solvent for a period of about 24 hours or longer (such as about 48 hours, or about 72 hours), such as less than about 0.1% of the atoms and/or molecules of the SOF being leached out after immersing the SOF in a solvent for a period of about 24 hours or longer (such as about 48 hours, or about 72 hours), or less than about 0.01% of the atoms and/or molecules of the SOF being leached out after immersing the SOF in a solvent for a period of about 24 hours or longer (such as about 48 hours, or about 72 hours).

The term "solvent" refers, for example, to organic liquids, aqueous liquids, and/or water.

When a capping unit is introduced into the SOF, the SOF framework is locally 'interrupted' where the capping units are present. These SOF compositions are 'covalently doped' because a foreign molecule is bonded to the SOF framework when capping units are present. Capped SOF compositions may alter the properties of SOFs without changing constituent building blocks. For example, the mechanical and physical properties of the capped SOF where the SOF framework is interrupted may differ from that of an uncapped SOF.

The SOFs of the present disclosure may be, at the macroscopic level, substantially pinhole-free SOFs or pinhole-free SOFs having continuous covalent organic frameworks that can extend over larger length scales such as for instance much greater than a millimeter to lengths such as a meter and, in theory, as much as hundreds of meters. It will also be appreciated that SOFs tend to have large aspect ratios where typically two dimensions of a SOF will be much larger than the third. SOFs have markedly fewer macroscopic edges and disconnected external surfaces than a collection of COF particles.

In embodiments, a "substantially pinhole-free SOF" or "pinhole-free SOF" may be formed from a reaction mixture deposited on the surface of an underlying substrate. The term "substantially pinhole-free SOF" refers, for example, to an SOF that may or may not be removed from the underlying substrate on which it was formed and contains substantially no pinholes, pores or gaps greater than the distance between the cores of two adjacent segments per square cm; such as, for example, less than 10 pinholes, pores or gaps greater than about 250 nanometers in diameter per $cm^2$, or less than 5 pinholes, pores or gaps greater than about 100 nanometers in diameter per $cm^2$. The term "pinhole-free SOF" refers, for example, to an SOF that may or may not be removed from the underlying substrate on which it was formed and contains no pinholes, pores or gaps greater than the distance between the cores of two adjacent segments per $micron^2$, such as no pinholes, pores or gaps greater than about 500 Angstroms in diameter per $micron^2$, or no pinholes, pores or gaps greater than about 250 Angstroms in diameter per $micron^2$, or no pinholes, pores or gaps greater than about 100 Angstroms in diameter per $micron^2$.

A description of various exemplary molecular building blocks, linkers, SOF types, capping groups, strategies to synthesize a specific SOF type with exemplary chemical structures, building blocks whose symmetrical elements are outlined, and classes of exemplary molecular entities and examples of members of each class that may serve as molecular building blocks for SOFs are detailed in U.S. patent application Ser. Nos. 12/716,524; 12/716,449; 12/716,706; 12/716,324; 12/716,686; 12/716,571; 12/815,688; 12/845,053; 12/845,235; 12/854,962; 12/854,957; and 12/845,052 entitled "Structured Organic Films," "Structured Organic Films Having an Added Functionality," "Mixed Solvent Process for Preparing Structured Organic Films," "Composite Structured Organic Films," "Process For Preparing Structured Organic Films (SOFs) Via a Pre-SOF," "Electronic Devices Comprising Structured Organic Films," "Periodic Structured Organic Films," "Capped Structured Organic Film Compositions," "Imaging Members Comprising Capped Structured Organic Film Compositions," "Imaging Members for Ink-Based Digital Printing Comprising Structured Organic Films," "Imaging Devices Comprising Structured Organic Films," and "Imaging Members Comprising Structured Organic Films," respectively; and U.S. Provisional Application No. 61/157,411, entitled "Structured Organic Films" filed Mar. 4, 2009, the disclosures of which are totally incorporated herein by reference in their entireties.

Molecular Building Block

The SOFs of the present disclosure comprise molecular building blocks having a segment (5) and functional groups (Fg). Molecular building blocks require at least two functional groups ($x \geq 2$) and may comprise a single type or two or more types of functional groups. Functional groups are the reactive chemical moieties of molecular building blocks that participate in a chemical reaction to link together segments during the SOF forming process. A segment is the portion of the molecular building block that supports functional groups and comprises all atoms that are not associated with functional groups. Further, the composition of a molecular building block segment remains unchanged after SOF formation.

Molecular Building Block Symmetry

Molecular building block symmetry relates to the positioning of functional groups (Fgs) around the periphery of the molecular building block segments. Without being bound by chemical or mathematical theory, a symmetric molecular building block is one where positioning of Fgs may be associated with the ends of a rod, vertexes of a regular geometric shape, or the vertexes of a distorted rod or distorted geometric shape. For example, the most symmetric option for molecular building blocks containing four Fgs are those whose Fgs overlay with the corners of a square or the apexes of a tetrahedron.

Use of symmetrical building blocks is practiced in embodiments of the present disclosure for two reasons: (1) the patterning of molecular building blocks may be better anticipated because the linking of regular shapes is a better understood process in reticular chemistry, and (2) the complete reaction between molecular building blocks is facilitated because for less symmetric building blocks errant conformations/orientations may be adopted which can possibly initiate numerous linking defects within SOFs.

Figure 1O:
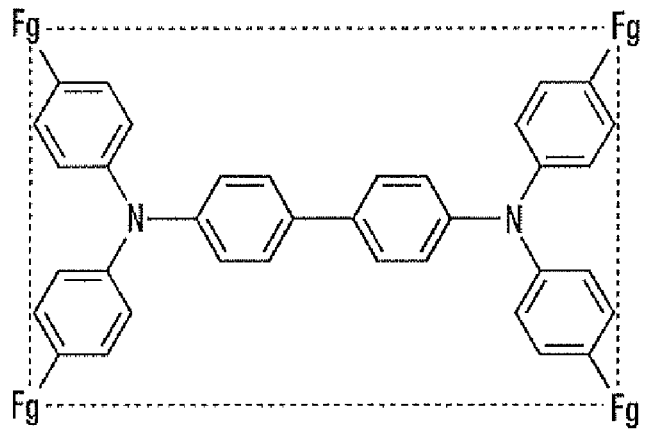

FIGS. 1A-O illustrate exemplary building blocks whose symmetrical elements are outlined. Such symmetrical elements are found in building blocks that may be used in the present disclosure.

Non-limiting examples of various classes of exemplary molecular entities that may serve as molecular building blocks for SOFs of the present disclosure include building blocks containing a carbon or silicon atomic core; building blocks containing alkoxy cores; building blocks containing a nitrogen or phosphorous atomic core; building blocks containing aryl cores; building blocks containing carbonate cores; building blocks containing carbocyclic-, carbobicyclic-, or carbotricyclic core; and building blocks containing an oligothiophene core. Incorporation of one or more of the above molecular building blocks in the porous SOF reaction mixture may result in a porous SOF with a plurality of segments having one or more cores selected from the group consisting of carbon, nitrogen, silicon, or phosphorous atomic cores, alkyl cores, fluoroalkyl cores, alkoxy cores, aryl cores, carbonate cores, carbocyclic cores, carbobicyclic cores, carbotricyclic cores, and oligothiophene cores, respectively.

In embodiments, the Type 1 SOF contains segments, which are not located at the edges of the SOF, that are connected by linkers to at least three other segments. For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks. In embodiments, Type 2 and 3 SOF contains at least one segment type, which are not located at the edges of the SOF, that are connected by linkers to at least three other segments. For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks.

Functional Group

Functional groups are the reactive chemical moieties of molecular building blocks that participate in a chemical reaction to link together segments during the SOF forming process. Functional groups may be composed of a single atom, or functional groups may be composed of more than one atom. The atomic compositions of functional groups are those compositions normally associated with reactive moieties in chemical compounds. Non-limiting examples of functional groups include halogens, alcohols, ethers, ketones, carboxylic acids, esters, carbonates, amines, amides, imines, ureas, aldehydes, isocyanates, tosylates, alkenes, alkynes and the like.

Molecular building blocks contain a plurality of chemical moieties, but only a subset of these chemical moieties are intended to be functional groups during the SOF forming process. Whether or not a chemical moiety is considered a functional group depends on the reaction conditions selected for the SOF forming process. Functional groups (Fg) denote a chemical moiety that is a reactive moiety, that is, a functional group during the SOF forming process.

In the SOF forming process, the composition of a functional group will be altered through the loss of atoms, the gain of atoms, or both the loss and the gain of atoms; or, the functional group may be lost altogether. In the SOF, atoms previously associated with functional groups become associated with linker groups, which are the chemical moieties that join together segments. Functional groups have characteristic chemistries and those of ordinary skill in the art can generally recognize in the present molecular building blocks the atom(s) that constitute functional group(s). It should be noted that an atom or grouping of atoms that are identified as part of the molecular building block functional group may be preserved in the linker group of the SOF. Linker groups are described below.

Capping Unit

Capping units of the present disclosure are molecules that 'interrupt' the regular network of covalently bonded building blocks normally present in an SOF. Capped SOF compositions are tunable materials whose properties can be varied through the type and amount of capping unit introduced. Capping units may comprise a single type or two or more types of functional groups and/or chemical moieties.

In embodiments, the SOF comprises a plurality of segments, where all segments have an identical structure, and a plurality of linkers, which may or may not have an identical structure, wherein the segments that are not at the edges of the SOF are connected by linkers to at least three other segments and/or capping groups. In embodiments, the SOF comprises a plurality of segments where the plurality of segments comprises at least a first and a second segment that are different in structure, and the first segment is connected by linkers to at least three other segments and/or capping groups when it is not at the edge of the SOF.

In embodiments, the SOF comprises a plurality of linkers including at least a first and a second linker that are different in structure, and the plurality of segments either comprises at least a first and a second segment that are different in structure, where the first segment, when not at the edge of the SOF, is connected to at least three other segments and/or capping groups, wherein at least one of the connections is via the first linker, and at least one of the connections is via the second linker; or comprises segments that all have an identical structure, and the segments that are not at the edges of the SOF are connected by linkers to at least three other segments and/or capping groups, wherein at least one of the connections is via the first linker, and at least one of the connections is via the second linker.

Segment

A segment is the portion of the molecular building block that supports functional groups and comprises all atoms that are not associated with functional groups. Further, the composition of a molecular building block segment remains unchanged after SOF formation. In embodiments, the SOF may contain a first segment having a structure the same as or different from a second segment. In other embodiments, the structures of the first and/or second segments may be the same as or different from a third segment, forth segment, fifth segment, etc. A segment is also the portion of the molecular building block that can provide an inclined property. Inclined properties are described later in the embodiments.

The SOF of the present disclosure comprise a plurality of segments including at least a first segment type and a plurality of linkers including at least a first linker type arranged as a covalent organic framework (COF) having a plurality of pores, wherein the first segment type and/or the first linker type comprises at least one atom that is not carbon. In embodiments, the segment (or one or more of the plurality of segments) of the SOF comprises at least one atom of an element that is not carbon, such as where the structure of the segment comprises at least one atom selected from the group consisting of hydrogen, oxygen, nitrogen, silicon, phosphorous, selenium, fluorine, boron, and sulfur.

Linker

A linker is a chemical moiety that emerges in a SOF upon chemical reaction between functional groups present on the molecular building blocks and/or capping unit.

A linker may comprise a covalent bond, a single atom, or a group of covalently bonded atoms. The former is defined as a covalent bond linker and may be, for example, a single covalent bond or a double covalent bond and emerges when functional groups on all partnered building blocks are lost entirely. The latter linker type is defined as a chemical moiety linker and may comprise one or more atoms bonded together by single covalent bonds, double covalent bonds, or combinations of the two. Atoms contained in linking groups originate from atoms present in functional groups on molecular building blocks prior to the SOF forming process. Chemical moiety linkers may be well-known chemical groups such as, for example, esters, ketones, amides, imines, ethers, urethanes, carbonates, and the like, or derivatives thereof. In embodiments, porous SOF having a plurality of linkers my comprise one or more linkers selected from the group consisting of single atom linkers, single covalent bond linkers, and double covalent bond linkers, ester linkers, ketone linkers, amide linkers, amine linkers, imine linkers, ether linkers, urethane linkers, and carbonates linkers.

For example, when two hydroxyl (—OH) functional groups are used to connect segments in a SOF via an oxygen atom, the linker would be the oxygen atom, which may also be described as an ether linker. In embodiments, the SOF may contain a first linker having a structure the same as or different from a second linker. In other embodiments, the structures of the first and/or second linkers may be the same as or different from a third linker, etc.

The SOF of the present disclosure comprise a plurality of segments including at least a first segment type and a plurality of linkers including at least a first linker type arranged as a covalent organic framework (COF) having a plurality of pores, wherein the first segment type and/or the first linker type comprises at least one atom that is not carbon. In embodiments, the linker (or one or more of the plurality of linkers) of the SOF comprises at least one atom of an element that is not carbon, such as where the structure of the linker comprises at least one atom selected from the group consisting of hydrogen, oxygen, nitrogen, silicon, phosphorous, selenium, fluorine, boron, and sulfur.

Metrical Parameters of SOFs

SOFs have any suitable aspect ratio. In embodiments, SOFs have aspect ratios for instance greater than about 30:1 or greater than about 50:1, or greater than about 70:1, or greater than about 100:1, such as about 1000:1. The aspect ratio of a SOF is defined as the ratio of its average width or diameter (that is, the dimension next largest to its thickness) to its average thickness (that is, its shortest dimension). The term 'aspect ratio,' as used here, is not bound by theory. The longest dimension of a SOF is its length and it is not considered in the calculation of SOF aspect ratio.

Multilayer SOFs

A SOF may comprise a single layer or a plurality of layers (that is, two, three or more layers). SOFs that are comprised of a plurality of layers may be physically joined (e.g., dipole and hydrogen bond) or chemically joined. Physically attached layers are characterized by weaker interlayer interactions or adhesion; therefore physically attached layers may be susceptible to delamination from each other. Chemically attached layers are expected to have chemical bonds (e.g., covalent or ionic bonds) or have numerous physical or intermolecular (supramolecular) entanglements that strongly link adjacent layers.

Therefore, delamination of chemically attached layers is much more difficult. Chemical attachments between layers may be detected using spectroscopic methods such as focusing infrared or Raman spectroscopy, or with other methods having spatial resolution that can detect chemical species precisely at interfaces. In cases where chemical attachments between layers are different chemical species than those within the layers themselves it is possible to detect these attachments with sensitive bulk analyses such as solid-state nuclear magnetic resonance spectroscopy or by using other bulk analytical methods.

In the embodiments, the coating may comprise a SOF where the SOF may be a single layer (mono-segment thick or multi-segment thick) or multiple layers (each layer being mono-segment thick or multi-segment thick, including any desired thickness, such as about 25 to about 500 segments thick). "Thickness" refers, for example, to the smallest dimension of the film. As discussed above, in a SOF, segments are molecular units that are covalently bonded through linkers to generate the molecular framework of the film. The thickness of the film may also be defined in terms of the number of segments that is counted along that axis of the film when viewing the cross-section of the film. A "monolayer" SOF is the simplest case and refers, for example, to where a film is one segment thick. A SOF where two or more segments exist along this axis is referred to as a "multi-segment" thick SOF.

An exemplary method for preparing a physically attached multilayer porous SOF includes: (1) forming a base SOF layer that may be cured by a first curing cycle, and (2) forming upon the base layer a second reactive wet layer followed by a second curing cycle and, if desired, repeating the second step to form a third layer, a forth layer and so on. The physically stacked multilayer SOFs may have thicknesses greater than about 20 Angstroms such as, for example, the following illustrative thicknesses: about 20 Angstroms to about 10 cm, such as about 1 nm to about 10 mm, or about 0.1 mm Angstroms to about 5 mm. In principle there is no limit with this process to the number of layers that may be physically stacked.

In embodiments, a multilayer porous SOF may be formed by a method for preparing chemically attached multilayer SOFs by: (1) forming a base SOF layer having functional groups present on the surface (or dangling functional groups) from a first reactive wet layer, and (2) forming upon the base layer a second SOF layer from a second reactive wet layer that comprises molecular building blocks with functional groups capable of reacting with the dangling functional groups on the surface of the base SOF layer. In further embodiments, a capped SOF may serve as the base layer in which the functional groups present that were not suitable or complementary to participate in the specific chemical reaction to link together segments during the base layer SOF forming process may be available for reacting with the molecular building blocks of the second layer to from an chemically bonded multilayer SOF. If desired, the formulation used to form the second SOF layer should comprise molecular building blocks with functional groups capable of reacting with the functional groups from the base layer as well as additional functional groups that will allow for a third layer to be chemically attached to the second layer. The chemically stacked multilayer SOFs may have thicknesses greater than about 20 Angstroms such as, for example, the following illustrative thicknesses: about 20 Angstroms to about 10 cm, such as about 1 nm to about 10 mm, or about 0.1 mm Angstroms to about 5 mm. In principle there is no limit with this process to the number of layers that may be chemically stacked.

In embodiments, the method for preparing chemically attached multilayer SOFs comprises promoting chemical attachment of a second SOF onto an existing SOF (base layer) by using a small excess of one molecular building block (when more than one molecular building block is present) during the process used to form the SOF (base layer) whereby the functional groups present on this molecular building block will be present on the base layer surface. The surface of base layer may be treated with an agent to enhance the reactivity of the functional groups or to create an increased number of functional groups.

In an embodiment the dangling functional groups or chemical moieties present on the surface of an SOF or capped SOF may be altered to increase the propensity for covalent attachment (or, alternatively, to disfavor covalent attachment) of particular classes of molecules or individual molecules, such as SOFs, to a base layer or any additional substrate or SOF layer. For example, the surface of a base layer, such as an SOF layer, which may contain reactive dangling functional groups, may be rendered pacified through surface treatment with a capping chemical group. For example, a SOF layer having dangling hydroxyl alcohol groups may be pacified by treatment with trimethylsiylchloride thereby capping hydroxyl groups as stable trimethylsilylethers. Alternatively, the surface of base layer may be treated with a non-chemically bonding agent, such as a wax, to block reaction with dangling functional groups from subsequent layers.

Molecular Building Block Symmetry

Molecular building block symmetry relates to the positioning of functional groups (Fgs) around the periphery of the molecular building block segments. Without being bound by chemical or mathematical theory, a symmetric molecular building block is one where positioning of Fgs may be associated with the ends of a rod, vertexes of a regular geometric shape, or the vertexes of a distorted rod or distorted geometric shape. For example, the most symmetric option for molecular building blocks containing four Fgs are those whose Fgs overlay with the corners of a square or the apexes of a tetrahedron.

Use of symmetrical building blocks is practiced in embodiments of the present disclosure for two reasons: (1) the patterning of molecular building blocks may be better anticipated because the linking of regular shapes is a better understood process in reticular chemistry, and (2) the complete reaction between molecular building blocks is facilitated because for less symmetric building blocks errant conformations/orientations may be adopted which can possibly initiate numerous linking defects within SOFs.

In embodiments, a Type 1 SOF contains segments, which are not located at the edges of the SOF, that are connected by linkers to at least three other segments. For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks. In embodiments, Type 2 and 3 SOF contains at least one segment type, which are not located at the edges of the SOF, that are connected by linkers to at least three other segments. For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks.

Practice of Linking Chemistry

In embodiments linking chemistry may occur wherein the reaction between functional groups produces a volatile byproduct that may be largely evaporated or expunged from the SOF during or after the film forming process or wherein no byproduct is formed. Linking chemistry may be selected to achieve a SOF for applications where the presence of linking chemistry byproducts is not desired. Linking chemistry reactions may include, for example, condensation, addition/elimination, and addition reactions, such as, for example, those that produce esters, imines, ethers, carbonates, urethanes, amides, acetals, and silyl ethers.

In embodiments the linking chemistry via a reaction between function groups producing a non-volatile byproduct that largely remains incorporated within the SOF after the film forming process. Linking chemistry in embodiments may be selected to achieve a SOF for applications where the presence of linking chemistry byproducts does not impact the properties or for applications where the presence of linking chemistry byproducts may alter the properties of a SOF (such as, for example, the electroactive, hydrophobic or hydrophilic nature of the SOF). Linking chemistry reactions may include, for example, substitution, metathesis, and metal catalyzed coupling reactions, such as those that produce carbon-carbon bonds.

For all linking chemistry the ability to control the rate and extent of reaction between building blocks via the chemistry between building block functional groups is an important aspect of the present disclosure. Reasons for controlling the rate and extent of reaction may include adapting the film forming process for different coating methods and tuning the microscopic arrangement of building blocks to achieve a periodic SOF, as defined in earlier embodiments.

Innate Properties of COFs

COFs have innate properties such as high thermal stability (typically higher than 400° C. under atmospheric conditions); poor solubility in organic solvents (chemical stability), and porosity (capable of reversible guest uptake). In embodiments, SOFs may also possess these innate properties.

Added Functionality of SOFs

Added functionality denotes a property that is not inherent to conventional COFs and may occur by the selection of molecular building blocks wherein the molecular compositions provide the added functionality in the resultant SOF. Added functionality may arise upon assembly of molecular building blocks having an "inclined property" for that added functionality. Added functionality may also arise upon assembly of molecular building blocks having no "inclined property" for that added functionality but the resulting SOF has the added functionality as a consequence of linking segments (5) and linkers into a SOF. Furthermore, emergence of added functionality may arise from the combined effect of using molecular building blocks bearing an "inclined property" for that added functionality whose inclined property is modified or enhanced upon linking together the segments and linkers into a SOF.

An Inclined Property of a Molecular Building Block

The term "inclined property" of a molecular building block refers, for example, to a property known to exist for certain molecular compositions or a property that is reasonably identifiable by a person skilled in art upon inspection of the molecular composition of a segment. As used herein, the terms "inclined property" and "added functionality" refer to the same general property (e.g., hydrophobic, electroactive, etc.) but "inclined property" is used in the context of the molecular building block and "added functionality" is used in the context of the SOF.

The hydrophobic (superhydrophobic), hydrophilic, lipophobic (superlipophobic), lipophilic, photochromic and/or electroactive (conductor, semiconductor, charge transport material) nature of an SOF are some examples of the properties that may represent an "added functionality" of an SOF. These and other added functionalities may arise from the inclined properties of the molecular building blocks or may arise from building blocks that do not have the respective added functionality that is observed in the SOF.

The term hydrophobic (superhydrophobic) refers, for example, to the property of repelling water, or other polar species, such as methanol, it also means an inability to absorb water and/or to swell as a result. Furthermore, hydrophobic implies an inability to form strong hydrogen bonds to water or other hydrogen bonding species. Hydrophobic materials are typically characterized by having water contact angles greater than 90° as measured using a contact angle goniometer or related device. Highly hydrophobic as used herein can be described as when a droplet of water forms a high contact angle with a surface, such as a contact angle of from about 130° to about 180°. Superhydrophobic as used herein can be described as when a droplet of water forms a high contact angle with a surface, such as a contact angle of greater than about 150°, or from greater about 150° to about 180°.

Superhydrophobic as used herein can be described as when a droplet of water forms a sliding angle with a surface, such as a sliding angle of from about 1° to less than about 30°, or from about 1° to about 25°, or a sliding angle of less than about 15°, or a sliding angle of less than about 10°.

The term hydrophilic refers, for example, to the property of attracting, adsorbing, or absorbing water or other polar species, or a surface that is easily wetted by such species. Hydrophilic materials are typically characterized by having less than 20° water contact angle as measured using a contact angle goniometer or related device. Hydrophilicity may also be characterized by swelling of a material by water or other polar species, or a material that can diffuse or transport water, or other polar species, through itself. Hydrophilicity, is further characterized by being able to form strong or numerous hydrogen bonds to water or other hydrogen bonding species.

The term lipophobic (oleophobic) refers, for example, to the property of repelling oil or other non-polar species such as alkanes, fats, and waxes. Lipophobic materials are typically characterized by having oil contact angles greater than 90° as measured using a contact angle goniometer or related device. In the present disclosure, the term oleophobic refers, for example, to wettability of a surface that has an oil contact angle of approximately about 55° or greater, for example, with UV gel ink, solid ink, hexadecane, dodecane, hydrocarbons, etc. Highly oleophobic as used herein can be described as when a droplet of hydrocarbon-based liquid, for example, hexadecane or ink, forms a high contact angle with a surface, such as a contact angle of from about 130° or greater than about 130° to about 175° or from about 135° to about 170°. Superoleophobic as used herein can be described as when a droplet of hydrocarbon-based liquid, for example, ink, forms a high contact-angle with a surface, such as a contact angle that is greater than 150°, or from greater than about 150° to about 175°, or from greater than about 150° to about 160°.

Superoleophobic as used herein can also be described as when a droplet of a hydrocarbon-based liquid, for example, hexadecane, forms a sliding angle with a surface of from about 1° to less than about 30°, or from about 1° to less than about 25°, or a sliding angle of less than about 25°, or a sliding angle of less than about 15°, or a sliding angle of less than about 10°.

The term lipophilic (oleophilic) refers, for example, to the property attracting oil or other non-polar species such as alkanes, fats, and waxes or a surface that is easily wetted by such species. Lipophilic materials are typically characterized by having a low to nil oil contact angle as measured using, for example, a contact angle goniometer. Lipophilicity can also be characterized by swelling of a material by hexane or other non-polar liquids.

The term photochromic refers, for example, to the ability to demonstrate reversible color changes when exposed to electromagnetic radiation. SOF compositions containing photochromic molecules may be prepared and demonstrate reversible color changes when exposed to electromagnetic radiation. These SOFs may have the added functionality of photochromism. The robustness of photochromic SOFs may enable their use in many applications, such as photochromic SOFs for erasable paper, and light responsive films for window tinting/shading and eye wear. SOF compositions may contain any suitable photochromic molecule, such as a difunctional photochromic molecules as SOF molecular building blocks (chemically bound into SOF structure), a monofunctional photochromic molecules as SOF capping units (chemically bound into SOF structure, or unfunctionalized photochromic molecules in an SOF composite (not chemically bound into SOF structure). Photochromic SOFs may change color upon exposure to selected wavelengths of light and the color change may be reversible.

SOF compositions containing photochromic molecules that chemically bond to the SOF structure are exceptionally chemically and mechanically robust photochromic materials. Such photochromic SOF materials demonstrate many superior properties, such as high number of reversible color change processes, to available polymeric alternatives.

The term electroactive refers, for example, to the property to transport electrical charge (electrons and/or holes). Electroactive materials include conductors, semiconductors, and charge transport materials. Conductors are defined as materials that readily transport electrical charge in the presence of a potential difference. Semiconductors are defined as materials do not inherently conduct charge but may become conductive in the presence of a potential difference and an applied stimuli, such as, for example, an electric field, electromagnetic radiation, heat, and the like. Charge transport materials are defined as materials that can transport charge when charge is injected from another material such as, for example, a dye, pigment, or metal in the presence of a potential difference.

Conductors may be further defined as materials that give a signal using a potentiometer from about 0.1 to about $10^7$ S/cm.

Semiconductors may be further defined as materials that give a signal using a potentiometer from about $10^{-6}$ to about $10^4$ S/cm in the presence of applied stimuli such as, for example an electric field, electromagnetic radiation, heat, and the like. Alternatively, semiconductors may be defined as materials having electron and/or hole mobility measured using time-of-flight techniques in the range of $10^{-10}$ to about $10^6$ cm$^2$V$^{-1}$s$^{-1}$ when exposed to applied stimuli such as, for example an electric field, electromagnetic radiation, heat, and the like.

Charge transport materials may be further defined as materials that have electron and/or hole mobility measured using time-of-flight techniques in the range of $10^{-10}$ to about $10^6$ cm$^2$V$^{-1}$s$^{-1}$. It should be noted that under some circumstances charge transport materials may be also classified as semiconductors.

SOFs with hydrophobic added functionality may be prepared by using molecular building blocks with inclined hydrophobic properties and/or have a rough, textured, or porous surface on the sub-micron to micron scale. A paper describing materials having a rough, textured, or porous surface on the sub-micron to micron scale being hydrophobic was authored by Cassie and Baxter (Cassie, A. B. D.; Baxter, S. *Trans. Faraday Soc.*, 1944, 40, 546).

Molecular building blocks comprising or bearing highly-fluorinated segments have inclined hydrophobic properties and may lead to SOFs with hydrophobic added functionality. Highly-fluorinated segments are defined as the number of fluorine atoms present on the segment(s) divided by the number of hydrogen atoms present on the segment(s) being greater than one. Fluorinated segments, which are not highly-fluorinated segments may also lead to SOFs with hydrophobic added functionality. In embodiments, the SOF may have any desired fluorine content, such as an SOF with a fluorine content from about 20% to about 60% by weight. Other exemplary fluorinated SOFs are described in U.S. patent application Ser. No. 13/173,948, to Adrien P. Cote and Matthew A. Heuft entitled "Fluorinated Structured Organic Film Compositions," the disclosure of which is totally incorporated herein by reference in its entirety.

The above-mentioned fluorinated segments may include, for example, tetrafluorohydroquinone, perfluoroadipic acid hydrate, 4,4'-(hexafluoroisopropylidene)diphthalic anhydride, 4,4'-(hexafluoroisopropylidene)diphenol, and the like. Other exemplary fluorinated SOFs are described in U.S. patent application Ser. No. 13/173,948, to Adrien P. Cote and Matthew A. Heuft entitled "Fluorinated Structured Organic Film Compositions," the disclosure of which is totally incorporated herein by reference in its entirety.

SOFs having a rough, textured, or porous surface on the sub-micron to micron scale may also be hydrophobic. The rough, textured, or porous SOF surface can result from dangling functional groups present on the film surface or from the structure of the SOF. The type of pattern and degree of patterning depends on the geometry of the molecular building blocks and the linking chemistry efficiency. The feature size that leads to surface roughness or texture is from about 100 nm to about 10 µm, such as from about 500 nm to about 5 µm.

SOFs with hydrophilic added functionality may be prepared by using molecular building blocks with inclined hydrophilic properties and/or comprising polar linking groups.

Molecular building blocks comprising segments bearing polar substituents have inclined hydrophilic properties and may lead to SOFs with hydrophilic added functionality. The term polar substituents refers, for example, to substituents that can form hydrogen bonds with water and include, for example, hydroxyl, amino, ammonium, and carbonyl (such as ketone, carboxylic acid, ester, amide, carbonate, urea).

SOFs with electroactive added functionality may be prepared by using molecular building blocks with inclined electroactive properties and/or be electroactive resulting from the assembly of conjugated segments and linkers. The following sections describe molecular building blocks with inclined hole transport properties, inclined electron transport properties, and inclined semiconductor properties.

Process for Preparing a Structured Organic Film

The process for making porous SOFs of the present disclosure, such as solvent resistant porous SOFs, typically comprises a number of activities or steps (set forth below) that may be performed in any suitable sequence or where two or more activities are performed simultaneously or in close proximity in time:

A process for preparing a structured organic film comprising:

(a) preparing a liquid-containing reaction mixture comprising a plurality of molecular building blocks each comprising a segment and a number of functional groups, and a pre-SOF;

(b) depositing the reaction mixture as a wet film;

(c) promoting a change of the wet film including the molecular building blocks to a dry film comprising the SOF (dry SOF) comprising a plurality of the segments and a plurality of linkers arranged as a covalent organic framework, wherein at a macroscopic level the covalent organic framework is a film;

(d) optionally removing the SOF from the coating substrate to obtain a free-standing SOF;

(e) optionally processing the free-standing SOF into a roll;

(f) optionally cutting and seaming the SOF into a belt;

(g) optionally performing the above SOF formation process(es) upon an SOF (which was prepared by the above SOF formation process(es)) as a substrate for subsequent SOF formation process(es); and (h) optionally activating the above dry SOF in order empty the plurality of pores and remove any residual chemical species that may remain after formation of the SOF.

The process for making capped SOFs and/or composite SOFs typically comprises a similar number of activities or steps (set forth above) that are used to make a non-capped SOF. The capping unit and/or secondary component may be added during either step a, b or c, depending the desired distribution of the capping unit in the resulting SOF. For example, if it is desired that the capping unit and/or secondary component distribution is substantially uniform over the resulting SOF, the capping unit may be added during step a. Alternatively, if, for example, a more heterogeneous distribution of the capping unit and/or secondary component is desired, adding the capping unit and/or secondary component (such as by spraying it on the film formed during step b or during the promotion step of step c) may occur during steps b and c.

The above activities or steps may be conducted at atmospheric, super atmospheric, or subatmospheric pressure. The term "atmospheric pressure" as used herein refers to a pressure of about 760 torr. The term "super atmospheric" refers to pressures greater than atmospheric pressure, but less than 20 atm. The term "subatmospheric pressure" refers to pressures less than atmospheric pressure. In an embodiment, the activities or steps may be conducted at or near atmospheric pressure. Generally, pressures of from about 0.1 atm to about 2 atm, such as from about 0.5 atm to about 1.5 atm, or 0.8 atm to about 1.2 atm may be conveniently employed.

Process Action A: Preparation of the Liquid-Containing Reaction Mixture

The reaction mixture comprises a plurality of molecular building blocks that are dissolved, suspended, or mixed in a liquid. The plurality of molecular building blocks may be of one type or two or more types. When one or more of the molecular building blocks is a liquid, the use of an additional liquid is optional. Catalysts may optionally be added to the reaction mixture to enable pre-SOF formation and/or modify the kinetics of SOF formation during Action C described above. The term "pre-SOF" may refer to, for example, at least two molecular building blocks that have reacted and have a molecular weight higher than the starting molecular building block and contain multiple functional groups capable of undergoing further reactions with functional groups of other building blocks or pre-SOFs to obtain a SOF, which may be a substantially defect-free or defect-free SOF, and/or the 'activation' of molecular building block functional groups that imparts enhanced or modified reactivity for the film forming process. Activation may include dissociation of a functional group moiety, pre-association with a catalyst, association with a solvent molecule, liquid, second solvent, second liquid, secondary component, or with any entity that modifies functional group reactivity. In embodiments, pre-SOF formation may include the reaction between molecular building blocks or the 'activation' of molecular building block functional groups, or a combination of the two. The formation of the "pre-SOF" may be achieved by in a number of ways, such as heating the reaction mixture, exposure of the reaction mixture to UV radiation, or any other means of partially reacting the molecular building blocks and/or activating functional groups in the reaction mixture prior to deposition of the wet layer on the substrate. Additives or secondary components may optionally be added to the reaction mixture to alter the physical properties of the resulting SOF.

The reaction mixture components (molecular building blocks, optionally a liquid, optionally catalysts, and optionally additives) are combined in a vessel. The order of addition of the reaction mixture components may vary; however, typically when a process for preparing a SOF includes a pre-SOF or formation of a pre-SOF, the catalyst, when present, may be added to the reaction mixture before depositing the reaction mixture as a wet film. In embodiments, the molecular building blocks may be reacted actinically, thermally, chemically or by any other means with or without the presence of a catalyst to obtain a pre-SOF. The pre-SOF and the molecular building blocks formed in the absence of catalyst may be may be heated in the liquid in the absence of the catalyst to aid the dissolution of the molecular building blocks and pre-SOFs. In embodiments, the pre-SOF and the molecular building blocks formed in the presence of catalyst may be may be heated at a temperature that does not cause significant further reaction of the molecular building blocks and/or the pre-SOFs to aid the dissolution of the molecular building blocks and pre-SOFs. The reaction mixture may also be mixed, stirred, milled, or the like, to ensure even distribution of the formulation components prior to depositing the reaction mixture as a wet film.

In embodiments, the reaction mixture may be heated prior to being deposited as a wet film. This may aid the dissolution of one or more of the molecular building blocks and/or increase the viscosity of the reaction mixture by the partial reaction of the reaction mixture prior to depositing the wet layer to form pre-SOFs. For example, the weight percent of molecular building blocks in the reaction mixture that are incorporated into pre-reacted molecular building blocks pre-SOFs may be less than 20%, such as about 15% to about 1%, or 10% to about 5%. In embodiments, the molecular weight of the 95% pre-SOF molecules is less than 5,000 daltons, such as 2,500 daltons, or 1,000 daltons. The preparation of pre-SOFs may be used to increase the loading of the molecular building blocks in the reaction mixture.

In the case of pre-SOF formation via functional group activation, the molar percentage of functional groups that are activated may be less than 50%, such as about 30% to about 10%, or about 10% to about 5%.

In embodiments, the two methods of pre-SOF formation (pre-SOF formation by the reaction between molecular building blocks or pre-SOF formation by the 'activation' of molecular building block functional groups) may occur in combination and the molecular building blocks incorporated into pre-SOF structures may contain activated functional groups. In embodiments, pre-SOF formation by the reaction between molecular building blocks and pre-SOF formation by the 'activation' of molecular building block functional groups may occur simultaneously.

In embodiments, the duration of pre-SOF formation lasts about 10 seconds to about 48 hours, such as about 30 seconds to about 12 hours, or about 1 minute to 6 hours.

In particular embodiments, the reaction mixture needs to have a viscosity that will support the deposited wet layer. Reaction mixture viscosities range from about 10 to about 50,000 cps, such as from about 25 to about 25,000 cps or from about 50 to about 1000 cps.

The molecular building block and capping unit loading or "loading" in the reaction mixture is defined as the total weight of the molecular building blocks and optionally the capping units and catalysts divided by the total weight of the reaction mixture. Building block loadings may range from about 3 to 100%, such as from about 5 to about 50%, or from about 15 to about 40%. In the case where a liquid molecular building block is used as the only liquid component of the reaction mixture (i.e. no additional liquid is used), the building block loading would be about 100%. The capping unit loading may be chosen, so as to achieve the desired loading of the capping group. For example, depending on when the capping unit is to be added to the reaction mixture, capping unit loadings may range, by weight, from about 3 to 80%, such as from about 5 to about 50%, or from about 15 to about 40% by weight.

In embodiments, the theoretical upper limit for capping unit loading is the molar amount of capping units that reduces the number of available linking groups to 2 per molecular building block in the liquid SOF formulation. In such a loading, substantial SOF formation may be effectively inhibited by exhausting (by reaction with the respective capping group) the number of available linkable functional groups per molecular building block. For example, in such a situation (where the capping unit loading is in an amount sufficient to ensure that the molar excess of available linking groups is less than 2 per molecular building block in the liquid SOF formulation), oligomers, linear polymers, and molecular building blocks that are fully capped with capping units may predominately form instead of an SOF.

In embodiments, the pre-SOF may be made from building blocks with one or more of the added functionality selected from the group consisting of hydrophobic added functionality, superhydrophobic added functionality, hydrophilic added functionality, lipophobic added functionality, superlipophobic added functionality, lipophilic added functionality, photochromic added functionality, and electroactive added functionality. In embodiments, the inclined property of the molecular building blocks is the same as the added functionality of the pre-SOF. In embodiments, the added functionality of the SOF is not an inclined property of the molecular building blocks.

Liquids used in the reaction mixture may be pure liquids, such as solvents, and/or solvent mixtures. Liquids are used to dissolve or suspend the molecular building blocks and catalyst/modifiers in the reaction mixture. Liquid selection is generally based on balancing the solubility/dispersion of the molecular building blocks and a particular building block loading, the viscosity of the reaction mixture, and the boiling point of the liquid, which impacts the promotion of the wet layer to the dry SOF. Suitable liquids may have boiling points from about 30 to about 300° C., such as from about 65° C. to about 250° C., or from about 100° C. to about 180° C.

Liquids may include molecule classes such as alkanes (hexane, heptane, octane, nonane, decane, cyclohexane, cycloheptane, cyclooctane, decalin); mixed alkanes (hexanes, heptanes); branched alkanes (isooctane); aromatic compounds (toluene, o-, m-, p-xylene, mesitylene, nitrobenzene, benzonitrile, butylbenzene, aniline); ethers (benzyl ethyl ether, butyl ether, isoamyl ether, propyl ether); cyclic ethers (tetrahydrofuran, dioxane), esters (ethyl acetate, butyl acetate, butyl butyrate, ethoxyethyl acetate, ethyl propionate, phenyl acetate, methyl benzoate); ketones (acetone, methyl ethyl ketone, methyl isobutylketone, diethyl ketone, chloroacetone, 2-heptanone), cyclic ketones (cyclopentanone, cyclohexanone), amines (1°, 2°, or 3° amines such as butylamine, diisopropylamine, triethylamine, diisoproylethylamine; pyridine); amides (dimethylformamide, N-methylpyrrolidinone, N,N-dimethylformamide); alcohols (methanol, ethanol, n-, propanol, n-, i-, t-butanol, 1-methoxy-2-propanol, hexanol, cyclohexanol, 3-pentanol, benzyl alcohol); nitriles (acetonitrile, benzonitrile, butyronitrile), halogenated aromatics (chlorobenzene, dichlorobenzene, hexafluorobenzene), halogenated alkanes (dichloromethane, chloroform, dichloroethylene, tetrachloroethane); and water.

Mixed liquids comprising a first solvent, second solvent, third solvent, and so forth may also be used in the reaction mixture. Two or more liquids may be used to aid the dissolution/dispersion of the molecular building blocks; and/or increase the molecular building block loading; and/or allow a stable wet film to be deposited by aiding the wetting of the substrate and deposition instrument; and/or modulate the promotion of the wet layer to the dry SOF. In embodiments, the second solvent is a solvent whose boiling point or vapor-pressure curve or affinity for the molecular building blocks differs from that of the first solvent. In embodiments, a first solvent has a boiling point higher than that of the second solvent. In embodiments, the second solvent has a boiling point equal to or less than about 100° C., such as in the range of from about 30° C. to about 100° C., or in the range of from about 40° C. to about 90° C., or about 50° C. to about 80° C.

In embodiments, the first solvent, or higher boiling point solvent, has a boiling point equal to or greater than about 65° C., such as in the range of from about 80° C. to about 300° C., or in the range of from about 100° C. to about 250° C., or about 100° C. to about 180° C. The higher boiling point solvent may include, for example, the following (the value in parentheses is the boiling point of the compound): hydrocarbon solvents such as amylbenzene (202° C.), isopropylbenzene (152° C.), 1,2-diethylbenzene (183° C.), 1,3-diethylbenzene (181° C.), 1,4-diethylbenzene (184° C.), cyclohexylbenzene (239° C.), dipentene (177° C.), 2,6-dimethylnaphthalene (262° C.), p-cymene (177° C.), camphor oil (160-185° C.), solvent naphtha (110-200° C.), cis-decalin (196° C.), trans-decalin (187° C.), decane (174° C.), tetralin (207° C.), turpentine oil (153-175° C.), kerosene (200-245° C.), dodecane (216° C.), dodecylbenzene (branched), and so forth; ketone and aldehyde solvents such as acetophenone (201.7° C.), isophorone (215.3° C.), phorone (198-199° C.), methylcyclohexanone (169.0-170.5° C.), methyl n-heptyl ketone (195.3° C.), and so forth; ester solvents such as diethyl phthalate (296.1° C.), benzyl acetate (215.5° C.), γ-butyrolactone (204° C.), dibutyl oxalate (240° C.), 2-ethylhexyl acetate (198.6° C.), ethyl benzoate (213.2° C.), benzyl formate (203° C.), and so forth; diethyl sulfate (208° C.), sulfolane (285° C.), and halohydrocarbon solvents; etherified hydrocarbon solvents; alcohol solvents; ether/acetal solvents; polyhydric alcohol solvents; carboxylic anhydride solvents; phenolic solvents; water; and silicone solvents.

The ratio of the mixed liquids may be established by one skilled in the art. The ratio of liquids a binary mixed liquid may be from about 1:1 to about 99:1, such as from about 1:10 to about 10:1, or about 1:5 to about 5:1, by volume. When n liquids are used, with n ranging from about 3 to about 6, the amount of each liquid ranges from about 1% to about 95% such that the sum of each liquid contribution equals 100%.

In embodiments, the mixed liquid comprises at least a first and a second solvent with different boiling points. In further embodiments, the difference in boiling point between the first and the second solvent may be from about nil to about 150° C., such as from nil to about 50° C. For example, the boiling point of the first solvent may exceed the boiling point of the second solvent by about 1° C. to about 100° C., such as by about 5° C. to about 100° C., or by about 10° C. to about 50° C. The mixed liquid may comprise at least a first and a second solvent with different vapor pressures, such as combinations of high vapor pressure solvents and/or low vapor pressure solvents. The term "high vapor pressure solvent" refers to, for example, a solvent having a vapor pressure of at least about 1 kPa, such as about 2 kPa, or about 5 kPa. The term "low vapor pressure solvent" refers to, for example, a solvent having a vapor pressure of less than about 1 kPa, such as about 0.9 kPa, or about 0.5 kPa. In embodiments, the first solvent may be a low vapor pressure solvent such as, for example, terpineol, diethylene glycol, ethylene glycol, hexylene glycol, N-methyl-2-pyrrolidone, and tri(ethylene glycol) dimethyl ether. A high vapor pressure solvent allows rapid removal of the solvent by drying and/or evaporation at temperatures below the boiling point. High vapor pressure solvents may include, for example, acetone, tetrahydrofuran, toluene, xylene, ethanol, methanol, 2-butanone and water.

In embodiments where mixed liquids comprising a first solvent, second solvent, third solvent, and so forth are used in the reaction mixture, promoting the change of the wet film and forming the dry SOF may comprise, for example, heating the wet film to a temperature above the boiling point of the reaction mixture to form the dry SOF film; or heating the wet film to a temperature above the boiling point of the second solvent (below the temperature of the boiling point of the first solvent) in order to remove the second solvent while substantially leaving the first solvent and then after substantially removing the second solvent, removing the first solvent by heating the resulting composition at a temperature either above or below the boiling point of the first solvent to form the dry SOF film; or heating the wet film below the boiling point of the second solvent in order to remove the second solvent (which is a high vapor pressure solvent) while substantially leaving the first solvent and, after removing the second solvent, removing the first solvent by heating the resulting composition at a temperature either above or below the boiling point of the first solvent to form the dry SOF film.

The term "substantially removing" refers to, for example, the removal of at least 90% of the respective solvent, such as about 95% of the respective solvent. The term "substantially leaving" refers to, for example, the removal of no more than 2% of the respective solvent, such as removal of no more than 1% of the respective solvent.

These mixed liquids may be used to slow or speed up the rate of conversion of the wet layer to the SOF in order to manipulate the characteristics of the SOFs. For example, in condensation and addition/elimination linking chemistries, liquids such as water, 1°, 2°, or 3° alcohols (such as methanol, ethanol, propanol, isopropanol, butanol, 1-methoxy-2-propanol, tert-butanol) may be used.

Optionally a catalyst may be present in the reaction mixture to assist the promotion of the wet layer to the dry SOF. Selection and use of the optional catalyst depends on the functional groups on the molecular building blocks. Catalysts may be homogeneous (dissolved) or heterogeneous (undissolved or partially dissolved) and include Brönsted acids (HCl(aq), acetic acid, p-toluenesulfonic acid, amine-protected p-toluenesulfonic acid such as pyrridium p-toluenesulfonate, trifluoroacetic acid); Lewis acids (boron trifluoroetherate, aluminum trichloride); Brönsted bases (metal hydroxides such as sodium hydroxide, lithium hydroxide, potassium hydroxide; 1°, 2°, or 3° amines such as butylamine, diisopropylamine, triethylamine, diisoproylethylamine); Lewis bases (N,N-dimethyl-4-aminopyridine); metals (Cu bronze); metal salts ($FeCl_3$, $AuCl_3$); and metal complexes (ligated palladium complexes, ligated ruthenium catalysts). Typical catalyst loading ranges from about 0.01% to about 25%, such as from about 0.1% to about 5% of the molecular building block loading in the reaction mixture. The catalyst may or may not be present in the final SOF composition.

Optionally additives or secondary components, such as dopants, may be present in the reaction mixture and wet layer. Such additives or secondary components may also be integrated into a dry SOF. Additives or secondary components can be homogeneous or heterogeneous in the reaction mixture and wet layer or in a dry SOF. The terms "additive" or "secondary component," refer, for example, to atoms or molecules that are not covalently bound in the SOF, but are randomly distributed in the composition. In embodiments, secondary components such as conventional additives may be used to take advantage of the known properties associated with such conventional additives. Such additives may be used to alter the physical properties of the SOF such as electrical properties (conductivity, semiconductivity, electron transport, hole transport), surface energy (hydrophobicity, hydrophilicity), tensile strength, and thermal conductivity; such additives may include impact modifiers, reinforcing fibers, lubricants, antistatic agents, coupling agents, wetting agents, antifogging agents, flame retardants, ultraviolet stabilizers, antioxidants, biocides, dyes, pigments, odorants, deodorants, nucleating agents and the like.

In embodiments, the SOF may contain antioxidants as a secondary component to protect the SOF from oxidation. Examples of suitable antioxidants include (1) N,N'-hexamethylene bis(3,5-di-tert-butyl-4-hydroxy hydrocinnamide) (IRGANOX 1098, available from Ciba-Geigy Corporation), (2) 2,2-bis(4-(2-(3,5-di-tert-butyl-4-hydroxyhydrocinnamoyloxy))ethoxyphenyl)propane (TOPANOL-205, available from ICI America Corporation), (3) tris(4-tert-butyl-3-hydroxy-2,6-dimethyl benzyl)isocyanurate (CYANOX 1790, 41,322-4, LTDP, Aldrich D12, 840-6), (4) 2,2'-ethylidene bis(4,6-di-tert-butylphenyl)fluoro phosphorite (ETHANOX-398, available from Ethyl Corporation), (5) tetrakis(2,4-di-tert-butylphenyl)-4,4'-biphenyl diphosphonite (ALDRICH 46, 852-5; hardness value 90), (6) pentaerythritol tetrastearate (TCI America #P0739), (7) tributylammonium hypophosphite (Aldrich 42,009-3), (8) 2,6-di-tert-butyl-4-methoxyphenol (Aldrich 25, 106-2), (9) 2,4-di-tert-butyl-6-(4-methoxybenzyl)phenol (Aldrich 23,008-1), (10) 4-bromo-2,6-dimethylphenol (Aldrich 34, 951-8), (11) 4-bromo-3,5-didimethylphenol (Aldrich B6, 420-2), (12) 4-bromo-2-nitrophenol (Aldrich 30, 987-7), (13) 4-(diethyl aminomethyl)-2,5-dimethylphenol (Aldrich 14, 668-4), (14) 3-dimethylaminophenol (Aldrich D14, 400-2), (15) 2-amino-4-tert-amylphenol (Aldrich 41, 258-9), (16) 2,6-bis(hydroxymethyl)-p-cresol (Aldrich 22, 752-8), (17) 2,2'-methylenediphenol (Aldrich B4, 680-8), (18) 5-(diethylamino)-2-nitrosophenol (Aldrich 26, 951-4), (19) 2,6-dichloro-4-fluorophenol (Aldrich 28, 435-1), (20) 2,6-dibromo fluoro phenol (Aldrich 26,003-7), (21) α trifluoro-o-cresol (Aldrich 21, 979-7), (22) 2-bromo-4-fluorophenol (Aldrich 30, 246-5), (23) 4-fluorophenol (Aldrich F1, 320-7), (24) 4-chlorophenyl-2-chloro-1,1,2-tri-fluoroethyl sulfone (Aldrich 13, 823-1), (25) 3,4-difluoro phenylacetic acid (Aldrich 29,043-2), (26) 3-fluorophenylacetic acid (Aldrich 24, 804-5), (27) 3,5-difluoro phenylacetic acid (Aldrich 29,044-0), (28) 2-fluorophenylacetic acid (Aldrich 20, 894-9), (29) 2,5-bis (trifluoromethyl)benzoic acid (Aldrich 32, 527-9), (30) ethyl-2-(4-(4-(trifluoromethyl)phenoxy)phenoxy) propionate (Aldrich 25,074-0), (31) tetrakis (2,4-di-tert-butyl phenyl)-4,4'-biphenyl diphosphonite (Aldrich 46, 852-5), (32) 4-tert-amyl phenol (Aldrich 15, 384-2), (33) 3-(2H-benzotriazol-2-yl)-4-hydroxy phenethylalcohol (Aldrich 43,071-4), NAUGARD 76, NAUGARD 445, NAUGARD 512, and NAUGARD 524 (manufactured by Uniroyal Chemical Company), and the like, as well as mixtures thereof. The antioxidant, when present, may be present in the SOF composite in any desired or effective amount, such as from about 0.25 percent to about 10 percent by weight of the SOF or from about 1 percent to about 5 percent by weight of the SOF.

In embodiments, the SOF may further comprise any suitable polymeric material known in the art as a secondary component, such as polycarbonates, acrylate polymers, vinyl polymers, cellulose polymers, polyesters, polysiloxanes, polyamides, polyurethanes, polystyrenes, polystyrene, polyolefins, fluorinated hydrocarbons (fluorocarbons), and engineered resins as well as block, random or alternating copolymers thereof. The SOF composite may comprise homopolymers, higher order polymers, or mixtures thereof, and may comprise one species of polymeric material or mixtures of multiple species of polymeric material, such as mixtures of two, three, four, five or more multiple species of polymeric material. In embodiments, suitable examples of the about polymers include, for example, crystalline and amorphous polymers, or a mixtures thereof. In embodiments, the polymer is a fluoroelastomer.

Suitable fluoroelastomers are those described in detail in U.S. Pat. Nos. 5,166,031, 5,281,506, 5,366,772, 5,370,931, 4,257,699, 5,017,432 and 5,061,965, the disclosures each of which are incorporated by reference herein in their entirety.

The amount of fluoroelastomer compound present in the SOF, in weight percent total solids, is from about 1 to about 50 percent, or from about 2 to about 10 percent by weight of the SOF. Total solids, as used herein, includes the amount of secondary components and SOF.

In embodiments, examples of styrene-based monomer and acrylate-based monomers include, for example, poly(styrene-alkyl acrylate), poly(styrene-1,3-diene), polystyrene-alkyl methacrylate), poly(styrene-alkyl acrylate-acrylic acid), poly(styrene-1,3-diene-acrylic acid), polystyrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), and other similar polymers.

Further examples of the various polymers that are suitable for use as a secondary component in SOFs include polyethylene terephthalate, polybutadienes, polysulfones, polyarylethers, polyarylsulfones, polyethersulfones, polycarbonates, polyethylenes, polypropylenes, polydecene, polydodecene, polytetradecene, polyhexadecene, polyoctadene, and polycyclodecene, polyolefin copolymers, mixtures of polyolefins, functional polyolefins, acidic polyolefins, branched polyolefins, polymethylpentenes, polyphenylene sulfides, polyvinyl acetates, polyvinylbutyrals, polysiloxanes, polyacrylates, polyvinyl acetals, polyamides, polyimides, polystyrene and acrylonitrile copolymers, polyvinylchlorides, polyvinyl alcohols, poly-N-vinylpyrrolidinone)s, vinylchloride and vinyl acetate copolymers, acrylate copolymers, poly(amideimide), styrene-butadiene copolymers, vinylidenechloride-vinylchloride copolymers, vinylacetate-vinylidenechloride copolymers, polyvinylcarbazoles, polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate), SPAR™ (Dixie Chemicals), BECKOSOL™ (Reichhold Chemical Inc), ARAKOTE™ (Ciba-Geigy Corporation), HETRON™ (Ashland Chemical), PARAPLEX™ (Rohm & Hass), POLYLITE™ (Reicbhold Chemical Inc), PLASTHALL™ (Rohm & Hass), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation) mixtures thereof and the like.

In embodiments, the secondary components, including polymers may be distributed homogeneously, or heterogeneously, such as in a linear or nonlinear gradient in the SOF. In embodiments, the polymers may be incorporated into the SOF in the form of a fiber, or a particle whose size may range from about 50 nm to about 2 mm. The polymers, when present, may be present in the SOF composite in any desired or effective amount, such as from about 1 percent to about 50 percent by weight of the SOF or from about 1 percent to about 15 percent by weight of the SOF.

In embodiments, the SOF may further comprise carbon nanotubes or nanofiber aggregates, which are microscopic particulate structures of nanotubes, as described in U.S. Pat. Nos. 5,165,909; 5,456,897; 5,707,916; 5,877,110; 5,110,693; 5,500,200 and 5,569,635, all of which are hereby entirely incorporated by reference.

In embodiments, the SOF may further comprise metal particles as a secondary component; such metal particles include noble and non-noble metals and their alloys. Examples of suitable noble metals include, aluminum, titanium, gold, silver, platinum, palladium and their alloys. Examples of suitable non-noble metals include, copper, nickel, cobalt, lead, iron, bismuth, zinc, ruthenium, rhodium, rubidium, indium, and their alloys. The size of the metal particles may range from about 1 nm to 1 mm and their surfaces may be modified by stabilizing molecules or dispersant molecules or the like. The metal particles, when present, may be present in the SOF composite in any desired or effective amount, such as from about 0.25 percent to about 70 percent by weight of the SOF or from about 1 percent to about 15 percent by weight of the SOF.

In embodiments, the SOF may further comprise oxides and sulfides as secondary components. Examples of suitable metal oxides include, titanium dioxide (titania, rutile and related polymorphs), aluminum oxide including alumina, hydradated alumina, and the like, silicon oxide including silica, quartz, cristobalite, and the like, aluminosilicates including zeolites, talcs, and clays, nickel oxide, iron oxide, cobalt oxide. Other examples of oxides include glasses, such as silica glass, borosilicate glass, aluminosilicate glass and the like. Examples of suitable sulfides include nickel sulfide, lead sulfide, cadmium sulfide, tin sulfide, and cobalt sulfide. The diameter of the oxide and sulfide materials may range from about 50 nm to 1 mm and their surfaces may be modified by stabilizing molecules or dispersant molecules or the like. The oxides, when present, may be present in the SOF composite in any desired or effective amount, such as from about 0.25 percent to about 20 percent by weight of the SOF or from about 1 percent to about 15 percent by weight of the SOF.

In embodiments, the SOF may further comprise metalloid or metal-like elements from the periodic table. Examples of suitable metalloid elements include, silicon, selenium, tellurium, tin, lead, germanium, gallium, arsenic, antimony and their alloys or intermetallics. The size of the metal particles may range from about 10 nm to 1 mm and their surfaces may be modified by stabilizing molecules or dispersant molecules or the like. The metalloid particles, when present, may be present in the SOF composite in any desired or effective amount, such as from about 0.25 percent to about 10 percent by weight of the SOF or from about 1 percent to about 5 percent by weight of the SOF.

In embodiments, the SOF may further comprise hole transport molecules or electron acceptors as a secondary component, such charge transport molecules include for example a positive hole transporting material selected from compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and hydrazone compounds. Typical hole transport materials include electron donor materials, such as carbazole; N-ethyl carbazole; N-isopropyl carbazole; N-phenyl carbazole; tetraphenylpyrene; 1-methylpyrene; perylene; chrysene; anthracene; tetraphene; 2-phenyl naphthalene; azopyrene; 1-ethyl pyrene; acetyl pyrene; 2,3-benzochrysene; 2,4-benzopyrene; 1,4-bromopyrene; poly (N-vinylcarbazole); poly (vinylpyrene); poly(vinyltetraphene); poly(vinyltetracene) and poly(vinylperylene). Suitable electron transport materials include electron acceptors such as 2,4,7-trinitro-9-fluorenone; 2,4,5,7-tetranitro-fluorenone; dinitroanthracene; dinitroacridene; tetracyanopyrene; dinitroanthraquinone; and butylcarbonylfluorenemalononitrile, see U.S. Pat. No. 4,921,769 the disclosure of which is incorporated herein by reference in its entirety. Other hole transporting materials include arylamines described in U.S. Pat. No. 4,265,990 the disclosure of which is incorporated herein by reference in its entirety, such as N,N'-diphenyl-N,N'-bis(alkylphenyl)-(1,1'-biphenyl)-4,4'-diamine wherein alkyl is selected from the group consisting of methyl, ethyl, propyl, butyl, hexyl, and the like. Hole transport molecules of the type described in, for example, U.S. Pat. Nos. 4,306,008; 4,304,829; 4,233,384; 4,115,116; 4,299,897; 4,081,274, and 5,139,910, the entire disclosures of each are incorporated herein by reference. Other known charge transport layer molecules may be selected, reference for example U.S. Pat. Nos. 4,921,773 and 4,464,450 the disclosures of which are incorporated herein by reference in their entireties. The hole transport molecules or electron acceptors, when present, may be present in the SOF composite in any desired or effective amount, such as from about 0.25 percent to about 50 percent by weight of the SOF or from about 1 percent to about 20 percent by weight of the SOF.

In embodiments, the SOF may further comprise biocides as a secondary component. Biocides may be present in amounts of from about 0.1 to about 1.0 percent by weight of the SOF. Suitable biocides include, for example, sorbic acid, 1-(3-chloroallyl)-3,5,7-triaza-1-azoniaadamantane chloride, commercially available as DOWICIL 200 (Dow Chemical Company), vinylene-bis thiocyanate, commercially available as CYTOX 3711 (American Cyanamid Company), disodium ethylenebis-dithiocarbamate, commercially available as DITHONE D14 (Rohm & Haas Company), bis(trichloromethyl)sulfone, commercially available as BIOCIDE N-1386 (Stauffer Chemical Company), zinc pyridinethione, commercially available as zinc omadine (Olin Corporation), 2-bromo-t-nitropropane-1,3-diol, commercially available as ONYXIDE 500 (Onyx Chemical Company), BOSQUAT MB50 (Louza, Inc.), and the like.

In embodiments, the SOF may further comprise small organic molecules as a secondary component; such small organic molecules include those discussed above with respect to the first and second solvents. The small organic molecules, when present, may be present in the SOF in any desired or effective amount, such as from about 0.25 percent to about 50 percent by weight of the SOF or from about 1 percent to about 10 percent by weight of the SOF.

When present, the secondary components or additives may each, or in combination, be present in the composition in any desired or effective amount, such as from about 1 percent to about 50 percent by weight of the composition or from about 1 percent to about 20 percent by weight of the composition.

SOFs may be modified with secondary components (dopants and additives, such as, hole transport molecules (mTBD), polymers (polystyrene), nanoparticles (C60 Buckminster fullerene), small organic molecules (biphenyl), metal particles (copper micropowder), and electron acceptors (quinone)) to give composite structured organic films. Secondary components may be introduced to the liquid formulation that is used to generate a wet film in which a change is promoted to form the SOF. Secondary components (dopants, additives, etc.) may either be dissolved or undissolved (suspended) in the reaction mixture. Secondary components are not bonded into the network of the film. For example, a secondary component may be added to a reaction mixture that contains a plurality of building blocks having four methoxy groups (—OMe) on a segment, such as N4,N4,N4',N4'-tetra-p-tolylbiphenyl-4,4'-diamine, which upon promotion of a change in the wet film, exclusively react with the two alcohol (—OH) groups on a building block, such as 1,4-benzenedimethanol, which contains a p-xylyl segment. The chemistry that is occurring to link building blocks is an acid catalyzed transetherfication reaction. Because —OH groups will only react with —OMe groups (and vice versa) and not with the secondary component, these molecular building blocks can only follow one pathway. Therefore, the SOF is programmed to order molecules in a way that leaves the secondary component incorporated within and/or around the SOF structure. This ability to pattern molecules and incorporate secondary components affords superior performance and unprecedented control over properties compared to conventional polymers and available alternatives.

Optionally additives or secondary components, such as dopants, may be present in the reaction mixture and wet layer: Such additives or secondary components may also be integrated into a dry SOF. Additives or secondary components can be homogeneous or heterogeneous in the reaction mixture and wet layer or in a dry SOF. In contrast to capping units, the terms "additive" or "secondary component," refer, for example, to atoms or molecules that are not covalently bound in the SOF, but are randomly distributed in the composition. Suitable secondary components and additives are described in U.S. patent application Ser. No. 12/716,324, entitled "Composite Structured Organic Films," the disclosure of which is totally incorporated herein by reference in its entirety.

In embodiments, the secondary components may have similar or disparate properties to accentuate or hybridize (synergistic effects or ameliorative effects as well as the ability to attenuate inherent or inclined properties of the capped SOF) the intended property of the capped SOF to enable it to meet performance targets. For example, doping the capped SOFs with antioxidant compounds will extend the life of the capped SOF by preventing chemical degradation pathways. Additionally, additives maybe added to improve the morphological properties of the capped SOF by tuning the reaction occurring during the promotion of the change of the reaction mixture to form the capped SOF.

Process Action B: Depositing the Reaction Mixture as a Wet Film

The reaction mixture may be applied as a wet film to a variety of substrates, such as print head front faces, using a number of liquid deposition techniques. Alternatively, the porous SOF may be prepared and then attached to the print head front face. The thickness of the SOF is dependant on the thickness of the wet film and the molecular building block loading in the reaction mixture. The thickness of the wet film is dependent on the viscosity of the reaction mixture and the method used to deposit the reaction mixture as a wet film.

Substrates include, for example, polymers, papers, metals and metal alloys, doped and undoped forms of elements from Groups III-VI of the periodic table, metal oxides, metal chalcogenides, and previously prepared SOFs or capped SOFs. Examples of polymer film substrates include polyesters, polyolefins, polycarbonates, polystyrenes, polyvinylchloride, block and random copolymers thereof, and the like. Examples of metallic surfaces include metallized polymers, metal foils, metal plates; mixed material substrates such as metals patterned or deposited on polymer, semiconductor, metal oxide, or glass substrates. Examples of substrates comprised of doped and undoped elements from Groups of the periodic table include, aluminum, silicon, silicon n-doped with phosphorous, silicon p-doped with boron, tin, gallium arsenide, lead, gallium indium phosphide, and indium. Examples of metal oxides include silicon dioxide, titanium dioxide, indium tin oxide, tin dioxide, selenium dioxide, and alumina. Examples of metal chalcogenides include cadmium sulfide, cadmium telluride, and zinc selenide. Additionally, it is appreciated that chemically treated or mechanically modified forms of the above substrates remain within the scope of surfaces that may be coated with the reaction mixture.

In embodiments, the substrate may be composed of, for example, silicon, glass plate, plastic film or sheet. For structurally flexible devices, a plastic substrate such as polyester, polycarbonate, polyimide sheets and the like may be used. The thickness of the substrate may be from around 10 micrometers to over 10 millimeters with an exemplary thickness being from about 50 to about 100 micrometers, especially for a flexible plastic substrate, and from about 1 to about 10 millimeters for a rigid substrate such as glass or silicon.

The reaction mixture may be applied to the substrate using a number of liquid deposition techniques including, for example, spin coating, blade coating, web coating, dip coating, cup coating, rod coating, screen printing, ink jet printing, spray coating, stamping and the like. The method used to deposit the wet layer depends on the nature, size, and shape of the substrate and the desired wet layer thickness. The thickness of the wet layer can range from about 10 nm to about 5 mm, such as from about 100 nm to about 1 mm, or from about 1 μm to about 500 μm.

In embodiments, the capping unit and/or secondary component may be introduced following completion of the above described process action B. The incorporation of the capping unit and/or secondary component in this way may be accomplished by any means that serves to distribute the capping unit and/or secondary component homogeneously, heterogeneously, or as a specific pattern over the wet film. Following introduction of the capping unit and/or secondary component subsequent process actions may be carried out resuming with process action C.

For example, following completion of process action B (i.e., after the reaction mixture may be applied to the substrate), capping unit(s) and/or secondary components (dopants, additives, etc.) may be added to the wet layer by any suitable method, such as by distributing (e.g., dusting, spraying, pouring, sprinkling, etc, depending on whether the capping unit and/or secondary component is a particle, powder or liquid) the capping unit(s) and/or secondary component on the top the wet layer. The capping units and/or secondary components may be applied to the formed wet layer in a homogeneous or heterogeneous manner, including various patterns, wherein the concentration or density of the capping unit(s) and/or secondary component is reduced in specific areas, such as to form a pattern of alternating bands of high and low concentrations of the capping unit(s) and/or secondary component of a given width on the wet layer. In embodiments, the application of the capping unit(s) and/or secondary component to the top of the wet layer may result in a portion of the capping unit(s) and/or secondary component diffusing or sinking into the wet layer and thereby forming a heterogeneous distribution of capping unit(s) and/or secondary component within the thickness of the SOF, such that a linear or nonlinear concentration gradient may be obtained in the resulting SOF obtained after promotion of the change of the wet layer to a dry SOF. In embodiments, a capping unit(s) and/or secondary component may be added to the top surface of a deposited wet layer, which upon promotion of a change in the wet film, results in an SOF having an heterogeneous distribution of the capping unit(s) and/or secondary component in the dry SOF. Depending on the density of the wet film and the density of the capping unit(s) and/or secondary component, a majority of the capping unit(s) and/or secondary component may end up in the upper half (which is opposite the substrate) of the dry SOF or a majority of the capping unit(s) and/or secondary component may end up in the lower half (which is adjacent to the substrate) of the dry SOF.

Process Action C: Promoting the Change of Wet Film to the Dry SOF

The term "promoting" refers, for example, to any suitable technique to facilitate a reaction of the molecular building blocks and/or pre-SOFs, such as a chemical reaction of the functional groups of the building blocks and/or pre-SOFs. In the case where a liquid needs to be removed to form the dry film, "promoting" also refers to removal of the liquid. Reaction of the molecular building blocks and/or pre-SOFs and removal of the liquid can occur sequentially or concurrently. In certain embodiments, the liquid is also one of the molecular building blocks and is incorporated into the SOF. The term "dry SOF" refers, for example, to substantially dry SOFs, for example, to a liquid content less than about 5% by weight of the SOF, or to a liquid content less than 2% by weight of the SOF.

In embodiments, the dry SOF or a given region of the dry SOF (such as the surface to a depth equal to of about 10% of the thickness of the SOF or a depth equal to of about 5% of the thickness of the SOF, the upper quarter of the SOF, or the regions discussed above) has a molar ratio of capping units to segments of from about 1:100 to about 1:1, such as from about 1:50 to about 1:2, or from about 1:20 to 1:4.

Promoting the wet layer to form a dry SOF may be accomplished by any suitable technique. Promoting the wet layer to form a dry SOF typically involves thermal treatment including, for example, oven drying, infrared radiation (IR), and the like with temperatures ranging from 40 to 350° C. and from 60 to 200° C. and from 85 to 160° C. The total heating time can range from about four seconds to about 24 hours, such as from one minute to 120 minutes, or from three minutes to 60 minutes.

In embodiments where a secondary component is present, the molecular size of the secondary component may be selected such that during the promotion of the wet layer to form a dry SOF the secondary component is trapped within the framework of the SOF such that the trapped secondary component will not leach from the SOF during exposure to a liquid toner or solvent.

IR promotion of the wet layer to the COF film may be achieved using an IR heater module mounted over a belt transport system. Various types of IR emitters may be used, such as carbon IR emitters or short wave IR emitters (available from Heraerus). Additional exemplary information regarding carbon TR emitters or short wave IR emitters is summarized in the following Table (Table 1).

TABLE 1

Information regarding carbon IR emitters or short wave IR emitters

| IR lamp | Peak Wavelength | Number of lamps | Module Power (kW) |
|---|---|---|---|
| Carbon | 2.0 micron | 2 - twin tube | 4.6 |
| Short wave | 1.2-1.4 micron | 3 - twin tube | 4.5 |

Process Action D: Optionally Removing the SOF from the Coating Substrate to Obtain a Free-Standing SOF In embodiments, a free-standing SOF is desired. Free-standing SOFs may be obtained when an appropriate low adhesion substrate is used to support the deposition of the wet layer. Appropriate substrates that have low adhesion to the SOF may include, for example, metal foils, metalized polymer substrates, release papers and SOFs, such as SOFs prepared with a surface that has been altered to have a low adhesion or a decreased propensity for adhesion or attachment. Removal of the SOF from the supporting substrate may be achieved in a number of ways by someone skilled in the art. For example, removal of the SOF from the substrate may occur by starting from a corner or edge of the film and optionally assisted by passing the substrate and SOF over a curved surface.

Process Action E: Optionally Processing the Free-Standing SOF Into a Roll

Optionally, a free-standing SOF or a SOF supported by a flexible substrate may be processed into a roll. The SOF may be processed into a roll for storage, handling, and a variety of other purposes. The starting curvature of the roll is selected such that the SOF is not distorted or cracked during the rolling process.

Process Action F: Optionally Cutting and Seaming the SOF into a Shape, Such as a Belt The method for cutting and seaming the SOF is similar to that described in U.S. Pat. No. 5,455,136 issued on Oct. $3^{rd}$, 1995 (for polymer films), the disclosure of which is herein totally incorporated by reference. An SOF belt may be fabricated from a single SOF, a multi layer SOF or an SOF sheet cut from a web. Such sheets may be rectangular in shape or any particular shape as desired. All sides of the SOF(s) may be of the same length, or one pair of parallel sides may be longer than the other pair of parallel sides. The SOF(s) may be fabricated into shapes, such as a belt by overlap joining the opposite marginal end regions of the SOF sheet. A seam is typically produced in the overlapping marginal end regions at the point of joining. Joining may be affected by any suitable means. Typical joining techniques include, for example, welding (including ultrasonic), gluing, taping, pressure heat fusing and the like. Methods, such as ultrasonic welding, are desirable general methods of joining flexible sheets because of their speed, cleanliness (no solvents) and production of a thin and narrow seam.

Process Action G: Optionally Using a SOF as a Substrate for Subsequent SOF Formation Processes A SOF may be used as a substrate in the SOF forming process to afford a multi-layered structured organic film. The layers of a multi-layered SOF may be chemically bound in or in physical contact. Chemically bound, multi-layered SOFs are formed when functional groups present on the substrate SOF surface can react with the molecular building blocks present in the deposited wet layer used to form the second structured organic film layer. Multi-layered SOFs in physical contact may not chemically bound to one another.

A SOF substrate may optionally be chemically treated prior to the deposition of the wet layer to enable or promote chemical attachment of a second SOF layer to form a multi-layered structured organic film.

Alternatively, a SOF substrate may optionally be chemically treated prior to the deposition of the wet layer to disable chemical attachment of a second SOF layer (surface pacification) to form a physical contact multi-layered SOF.

Other methods, such as lamination of two or more SOFs, may also be used to prepare physically contacted multi-layered SOFs.

Process Action H: Optionally Activating the Dry SOF

In embodiments, the dry SOF may optionally be activated in order empty the plurality of pores and remove any residual chemical species that may remain after formation of the SOF. In embodiments, activating the dry SOF may comprise soaking the SOF in a solvent, such as an organic solvent (e.g., a volatile organic solvent), for a predetermined amount of time, such as for about 12 hours or more, or for about 24 hours or more. Optionally, the solvent may be refreshed and the soaking step may be repeated until the elution concentration of any residual species in the solvent that the SOF is immersed in is at a level of less than 10 ppm, such as less than 1 ppm, or less than 0.1 ppm. In embodiments, the SOF may be optionally heated (with or without reduced pressure) at one or more temperatures either before or after any of the above soaking steps. In embodiments, the heating temperature may be selected based on the thermal properties of the dry SOF and the identity of the soaking solvent. For example, generally dry SOFs may be heated to a temperature 150° C. for 12 hr, and then heated at 60° C. for 12 hours at $10^{-5}$ torr, without any degradation.

Patterned SOF Composition

An embodiment of the disclosure is to attain a SOF wherein the microscopic arrangement of segments is patterned. The term "patterning" refers, for example, to the sequence in which segments are linked together. A patterned SOF would therefore embody a composition wherein, for example, segment A is only connected to segment B, and conversely, segment B is only connected to segment A. Further, a system wherein only one segment exists, say segment A, is employed is will be patterned because A is intended to only react with A. In principle a patterned SOF may be achieved using any number of segment types. The patterning of segments may be controlled by using molecular building blocks whose functional group reactivity is intended to compliment a partner molecular building block and wherein the likelihood of a molecular building block to react with itself is minimized. The aforementioned strategy to segment patterning is non-limiting. Instances where a specific strategy to control patterning has not been deliberately implemented are also embodied herein.

A patterned film may be detected using spectroscopic techniques that are capable of assessing the successful formation of linking groups in a SOF. Such spectroscopies include, for example, Fourier-transfer infrared spectroscopy, Raman spectroscopy, and solid-state nuclear magnetic resonance spectroscopy. Upon acquiring a data by a spectroscopic technique from a sample, the absence of signals from functional groups on building blocks and the emergence of signals from linking groups indicate the reaction between building blocks and the concomitant patterning and formation of an SOF.

Different degrees of patterning are also embodied, Full patterning of a SOF will be detected by the complete absence of spectroscopic signals from building block functional groups. Also embodied are SOFs having lowered degrees of patterning wherein domains of patterning exist within the SOF. SOFs with domains of patterning, when measured spectroscopically, will produce signals from building block functional groups which remain unmodified at the periphery of a patterned domain.

It is appreciated that a very low degree of patterning is associated with inefficient reaction between building blocks and the inability to form a film. Therefore, successful implementation of the process of the present disclosure requires appreciable patterning between building blocks within the SOF. The degree of necessary patterning to form a SOF is variable and can depend on the chosen building blocks and desired linking groups. The minimum degree of patterning required is that required to form a film using the process described herein, and may be quantified as formation of about 20% or more of the intended linking groups, such as about 40% or more of the intended linking groups or about 50% or more of the intended linking groups; the nominal degree of patterning embodied by the present disclosure is formation of about 60% of the intended linking group, such as formation of about 100% of the intended linking groups. Formation of linking groups may be detected spectroscopically as described earlier in the embodiments.

Production of a Porous SOF

Example 1

(Action A) Preparation of the liquid containing reaction mixture. The following were combined: the building block (4,4',4'',4'''-(biphenyl-4,4'-diyibis(azanetriyl))tetrakis(benzene-4,1-diyl))tetramethanol [segment=(4,4',4'',4'''-(biphenyl-4,4'-diylbis(azanetriyl))tetrakis(benzene-4,1-diyl); Fg=alcohol (—OH); (1.48 g, 2.4 mmol)], and 8.3 g of N-methylpyridinone. The mixture was shaken and heated to 40° C. until a homogenous solution resulted. Upon cooling to room temperature, the solution was filtered through a 0.45 micron PTFE membrane. To the filtered solution was added an acid catalyst delivered as 0.15 g of a 10 wt % solution of p-toluenesulfonic acid in N-methylpyridinone to yield the liquid containing reaction mixture.

(Action B) Deposition of reaction mixture as a wet film. The reaction mixture was applied to the reflective side of a metalized (TiZr) MYLAR™ substrate using a constant velocity draw down coater outfitted with a bird bar having a 10 mil gap.

(Action C) Promotion of the change of the wet film to a dry SOF. The substrate supporting the wet layer was rapidly transferred to an actively vented oven preheated to 140° C. and left to heat for 40 minutes. These actions provided a dry SOF having a thickness ranging from about 5-10 microns. The color of the SOF was green-yellow.

Figure 2:
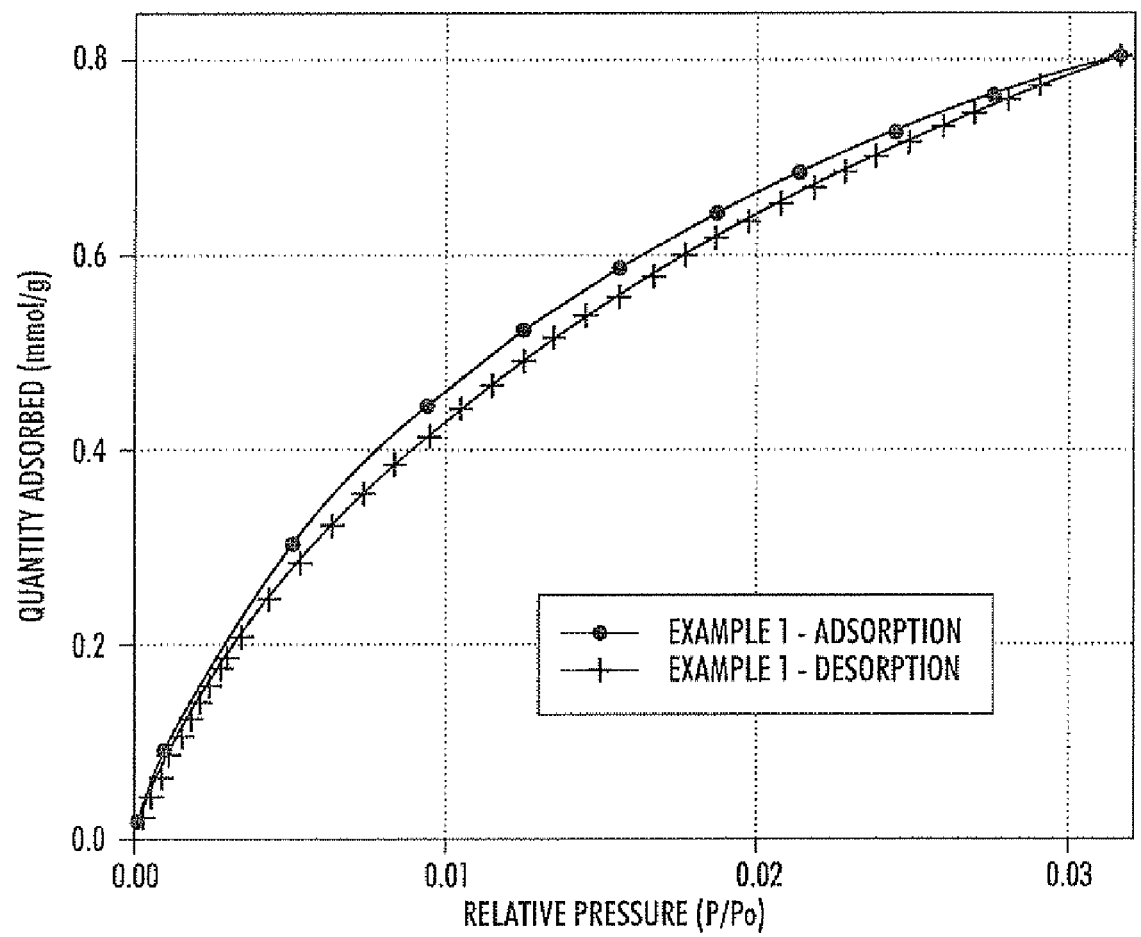
FIG. 2 is an illustration of a carbon dioxide gas adsorption isotherm for the SOF of Example 1.

The dry SOF was activated in order empty the pores with any chemical entities that may reside therein following SOF formation. The dry SOF was soaked in acetone for 12 hours, and then acetone was refreshed and a second soaking for 24 h was performed. Following acetone soaking the dry SOF was heated in a 150° C. for 12 hr, and then heated at 60° C. for 12 hours at $10^{-5}$ torr The permanent porosity of these films was measured using a state-of-the art gas adsorption method wherein the activated sample is dosed with carbon dioxide under supercritical conditions to obtain a gas adsorption isotherm (FIG. 2). Subsequent assessment of this isotherm using density functional theory extracts metrical parameters of the material's porosity.

The Langmuir surface area of the SOF was determined to be 155 $m^2/g$ (+/−1.7 $m^2/g$). The reversibility of the isotherm (i.e. desorption of carbon dioxide gas) indicates that the pores are permanent and do not collapse as is frequently the case in polymeric membranes.

Figure 3:
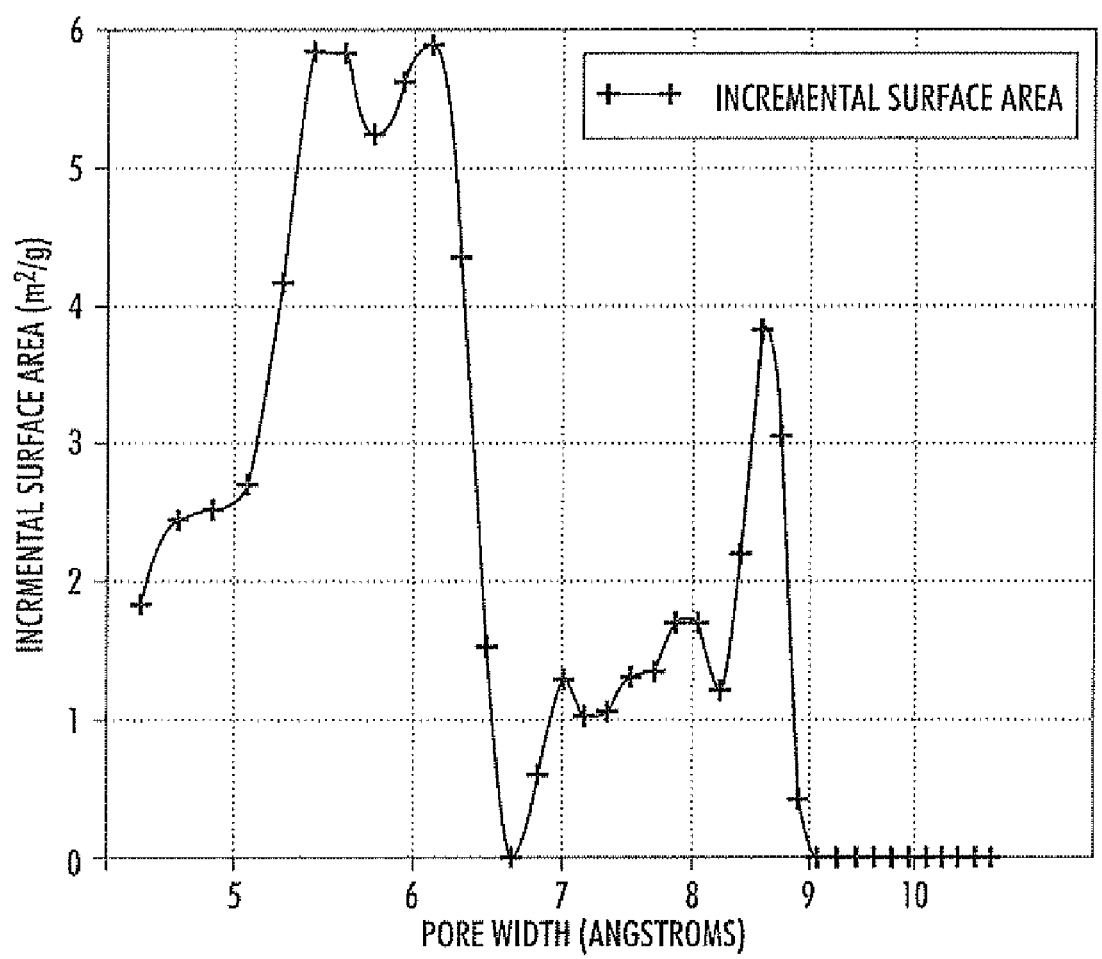
FIG. 3 an illustration of the pore size distribution for the SOF of Example 1.

Additionally from the isotherm in FIG. 2, the distribution of pore sizes with in the SOF can be determined (FIG. 3). The pore size distribution in FIG. 3 indicates that two sizes of pores exist within in the SOF: about 6 angstroms (0.6 nm) and about 8.5 angstroms (0.85 nm). These pore sizes are appropriate to host gas molecules like hydrogen and methane for vehicular applications and are ideal for separating carbon dioxide from combustion waste gas streams using pressure swing adsorption processes. The porosity of SOFs can be putatively adjusted by using building blocks that alter the internal pore structure within the SOF. For example, an SOF may be created with a more 'open' pore structure within the SOF by using other larger and/or divergent building blocks and linkers. Exemplary of molecular building block segments that support increased porosity include are depicted below:

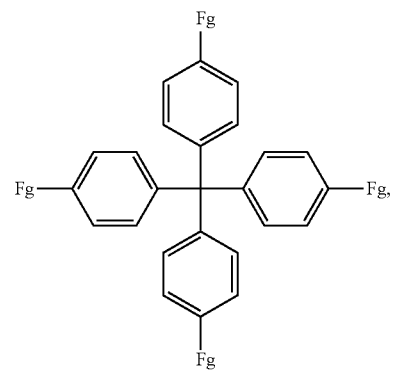

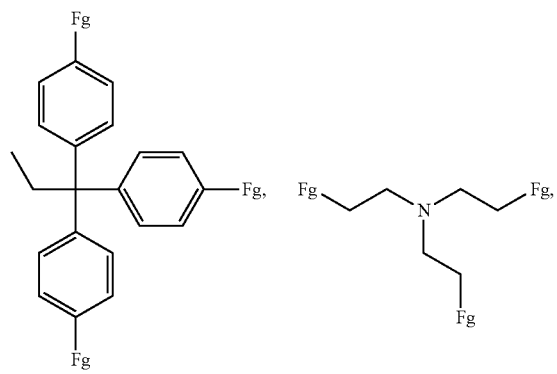

-continued

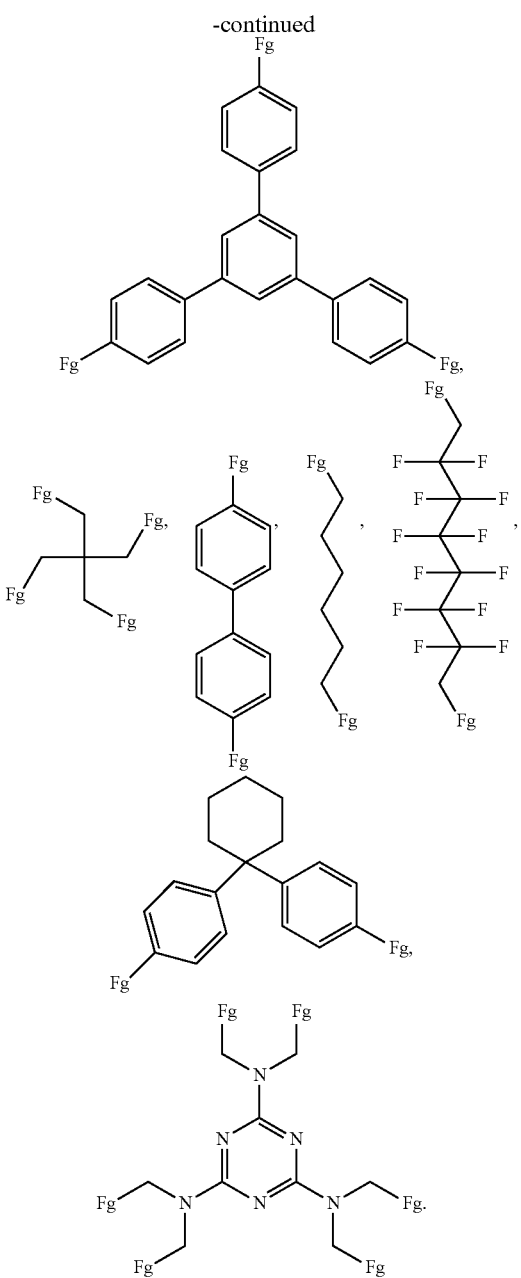

It will be appreciated that several of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A porous structured organic film (SOF) comprising a plurality of segments including at least a first segment type and a plurality of linkers including at least a first linker type arranged as a covalent organic framework (COF), and a plurality of pores, wherein the first segment type and/or the first linker type comprises at least one atom that is not carbon and the plurality of pores comprises a plurality of sites accessible to one or more entity.

2. The porous SOF of claim 1, wherein the SOF comprises a thermal stability range of at least up to 200° C.

3. The porous SOF of claim 1, wherein the SOF comprises and a Langmuir surface area of from about 75 m$^2$/g to about 3500 m$^2$/g.

4. A porous structured organic film (SOF) comprising a plurality of segments including at least a first segment type and a plurality of linkers including at least a first linker type arranged as a covalent organic framework (COF), and a plurality of pores, wherein the first segment type and/or the first linker type comprises at least one atom that is not carbon and the plurality of pores contain an adsorbed and/or absorbed chemical entity.

5. The porous SOF of claim 4, wherein the adsorbed or absorbed chemical entity is selected from the group consisting of ammonia, halogens, noble gasses, methane, natural gas, water, nitrogen, oxygen, sulfur, hydrogen sulfide, thiophenes, sulfur dioxide, carbon dioxide, carbon monoxide, hydrogen, lithium, ketones, esters, normal alkanes, branched alkanes, cyclic alkanes, polycyclic alkanes, arenes, waxes, sulfoxides, mecaptans, sulfides, disulfides, organoamines, nitrogen heterocycles, alcohols, carboxylic acids, sulfonic acids, nitrogen oxides, sulfur oxides, mineral acids, peptides, pharmaceutical molecules or agents, elements from the periodic table belonging to Group 8, elements from the periodic table belonging to Group 9, elements from the periodic table belonging to Group 10, elements from the periodic table belonging to Group 11, elements from the periodic table belonging to Group 12, and combinations thereof.

6. A porous structured organic film (SOF) comprising a plurality of segments including at least a first segment type and a plurality of linkers including at least a first linker type arranged as a covalent organic framework (COF), and a plurality of pores, wherein the first segment type and/or the first linker type comprises at least one atom that is not carbon and the plurality of pores is saturated with an adsorbed and/or absorbed chemical entity.

7. The porous SOF of claim 6, wherein the porous SOF is functionalized to provide selective atomic or molecular adsorption or absorption of a target chemical entity.

8. The porous SOF of claim 7, wherein target chemical entity is selected from the group consisting of ammonia, halogens, noble gasses, methane, natural gas, water, nitrogen, oxygen, sulfur, hydrogen sulfide, thiophenes, sulfur dioxide, carbon dioxide, carbon monoxide, hydrogen, lithium, ketones, esters, normal alkanes, branched alkanes, cyclic alkanes, polycyclic alkanes, arenes, waxes, sulfoxides, mecaptans, sulfides, disulfides, organoamines, nitrogen heterocycles, alcohols, carboxylic acids, sulfonic acids, nitrogen oxides, sulfur oxides, mineral acids, peptides, pharmaceutical molecules or agents, elements from the periodic table belonging to Group 8, elements from the periodic table belonging to Group 9, elements from the periodic table belonging to Group 10, elements from the periodic table belonging to Group 11, elements from the periodic table belonging to Group 12, and combinations thereof.

9. The porous SOF of claim 6, wherein the SOF comprises and a Langmuir surface area of from about 75 m$^2$/g to about 3500 m$^2$/g.

10. The porous SOF of claim 1, wherein the SOF is a membrane.

11. The porous SOF of claim 1, wherein the plurality of pores are functionalized with cationic or anionic moieties.

12. The porous SOF of claim 1, wherein the plurality of pores are functionalized with hydrophic, hydrophilic, anionic, cationic, lipophobic, or lipophilic moieties, or combinations thereof.

13. The porous SOF of claim 1, wherein the plurality of pore sizes ranges from about 4 Angstroms to about 40 Angstroms; or the SOF further comprises a capping unit.

14. The porous SOF of claim 1, wherein the SOF has a fluorine content from about 20% to about 60% by weight.

15. The porous SOF of claim 1, wherein the SOF is a substantially pinhole-free film.

16. The porous SOF of claim 1, wherein the SOF is a composite SOF.

17. The porous SOF of claim 1, wherein the SOF has an added functionality.

18. The porous SOF of claim 1, wherein the plurality of linkers are selected from the group consisting of single atom linkers, single covalent bond linkers, double covalent bond linkers, ester linkers, ketone linkers, amide linkers, amine linkers, imine linkers, ether linkers, urethane linkers, and carbonates linkers.

19. The porous SOF of claim 1, wherein the plurality of segments have a core selected from the group consisting of carbon, nitrogen, silicon, or phosphorous atomic cores, alkyl cores, fluoroalkyl cores, alkoxy cores, aryl cores, carbonate cores, carbocyclic cores, carbobicyclic cores, carbotricyclic cores, and oligothiophene cores.

20. The porous SOF of claim 1, wherein the SOF is 25 to about 500 segments thick.

* * * * *